(12) United States Patent
Lee et al.

(10) Patent No.: US 8,581,954 B2
(45) Date of Patent: Nov. 12, 2013

(54) MOBILE COMMUNICATION TERMINAL THAT DELIVERS VIBRATION INFORMATION, AND METHOD THEREOF

(75) Inventors: Seokkeon Lee, Seoul (KR); Hyunwook Kim, Gyeonggi-do (KR); Namgun Kim, Seoul (KR)

(73) Assignee: SK Telecom Co., Ltd. (KR)

( * ) Notice: Subject to any disclaimer, the term of this patent is extended or adjusted under 35 U.S.C. 154(b) by 278 days.

(21) Appl. No.: 12/737,976

(22) PCT Filed: Sep. 2, 2009

(86) PCT No.: PCT/KR2009/004938
§ 371 (c)(1),
(2), (4) Date: Mar. 31, 2011

(87) PCT Pub. No.: WO2010/027190
PCT Pub. Date: Mar. 11, 2010

(65) Prior Publication Data
US 2011/0169908 A1    Jul. 14, 2011

(30) Foreign Application Priority Data

| Sep. 5, 2008 | (KR) | ......................... 10-2008-0087644 |
| Sep. 8, 2008 | (KR) | ......................... 10-2008-0088108 |
| Mar. 10, 2009 | (KR) | ......................... 10-2009-0020054 |

(51) Int. Cl.
*H04N 7/15* (2006.01)

(52) U.S. Cl.
CPC ...................................... *H04N 7/15* (2013.01)
USPC ................... 348/14.02; 348/14.01; 455/414.1

(58) Field of Classification Search
USPC ................. 348/14.01–14.02; 455/517, 550.1, 455/556.2, 566, 567, 575.1; 340/7.58, 7.59, 340/7.6, 7.61, 7.62, 407.2; 715/702
See application file for complete search history.

(56) References Cited

U.S. PATENT DOCUMENTS

2008/0153554 A1*    6/2008   Yoon et al. .................... 455/567

FOREIGN PATENT DOCUMENTS

| JP | 2005-295170 | 10/2005 |
| JP | 2005295170 A | * 10/2005 |
| JP | 2005-332118 | 12/2005 |
| JP | 2007-312305 | 11/2007 |
| KR | 10-2006-0079071 A | 7/2006 |
| KR | 10-0744902 | 8/2007 |

* cited by examiner

*Primary Examiner* — Melur Ramakrishnaiah
(74) *Attorney, Agent, or Firm* — Baker Hostetler LLP

(57) ABSTRACT

A mobile communication terminal and a method for transferring vibration information are disclosed. The mobile communication terminal detects a movement of the mobile communication terminal caused by a user of the mobile communication terminal during a voice communication between the mobile communication terminal and a call partner terminal, generates vibration information corresponding to the movement of the mobile communication terminal, and transmits the generated vibration information to the call partner terminal, or receives vibration information generated by a call partner terminal during a voice communication between the mobile communication terminal and the call partner terminal and generates vibration corresponding to the movement of the call partner terminal, so as to enable the user of the mobile communication terminal and the call partner in communication with each other to share their emotion and feelings through the vibrations of the mobile communication terminal and the call partner terminal.

44 Claims, 14 Drawing Sheets

| VOICE INFO | VIBE PATTERNS INFO |
|---|---|
| I LOVE YOU | 003(STRONG WEAK STRONG WEAK) |
| FOOL | 007(S S W W) |
| IT'S ANNOYING | 012(W W W S S) |
| WHAT? | 020(S W W S S) |
| HEY | 004(S S S W) |
| NICE | 001(W W W W) |
| ⋮ | ⋮ |

*FIG. 6*

| PATTERNS | VIBRATION CODE | VIBRATION FORM |
|---|---|---|
| LEFTWARD | 0X01 | SHORT WEAK VIBRATION |
| RIGHTWARD | 0X02 | LONG WEAK VIBRATION |
| UPWARD | 0X03 | SHORT STRONG VIBRATION |
| ..... | ..... | ..... |

*FIG. 11*

| PATTERNS | VIBRATION CODE | VIBRATION FORM |
|---|---|---|
| HELLO | 0X01 | SHORT WEAK VIBRATION |
| HI | 0X02 | LONG WEAK VIBRATION |
| GOOD NIGHT | 0X03 | SHORT STRONG VIBRATION |
| ..... | ..... | ..... |

*FIG. 12*

MOBILE COMMUNICATION TERMINAL THAT DELIVERS VIBRATION INFORMATION, AND METHOD THEREOF

TECHNICAL FIELD

The present disclosure relates to a mobile communication terminal and method for transferring vibration information. More particularly, the present disclosure relates to a mobile communication terminal and method for stimulating senses of users by providing various vibrations to a user's own terminal or a call partner terminal in communication when the user shakes the user's own terminal or touches a screen of the user's own terminal, and relates to a mobile communication terminal and method for transferring situation-based vibrations proper for a particular condition or a user's request occurring during a video communication.

BACKGROUND ART

The statements in this section merely provide background information related to the present disclosure and may not constitute prior art.

Differently from the past communication, current communication is recognized as a field for sharing of culture and feelings as well as being simply used to transfer information. Especially, the mobile communication has become a service used by most people due to its high mobility and the trend of personalization, and a mobile communication terminal for using the mobile communication service has taken a place at the center of people's life as a tool for communication between people and as a medium for transferring the feelings.

The mobile communication terminal itself also has showed a development from the conventional simple provision of voice communication function, alarm function, etc. toward a direction capable of satisfying users' desire in various angles. As a result, functions developed for the current mobile communication terminals have reached a level, which enables a mobile communication terminal to provide various vibrations to stimulate senses of users when a user touches a screen of the mobile communication terminal or rocks the mobile communication terminal.

However, the only role achieved by the functions of the mobile communication terminals developed up to the present is to enable a mobile communication terminal and its user to sympathize with each other. In other words, the mobile communication terminal can provide various vibrations to a user only when the user touches or rocks the user's mobile communication terminal, but is unable to exchange emotion or sensitivity between the user and a call partner in voice communication or video communication through sharing of vibration information.

DISCLOSURE

Technical Problem

Accordingly, the present disclosure has been made to solve the above-mentioned problems occurring in the prior art and has been made in an effort to provide a mobile communication terminal and a method, which detects a movement of the mobile communication terminal caused by a user of the mobile communication terminal during a voice communication between the mobile communication terminal and a call partner terminal, generates vibration information (e.g. a digital signal corresponding to the movement of the mobile communication terminal), and transmits the generated vibration information to the call partner terminal, or receives vibration information generated by a call partner terminal during a voice communication between the mobile communication terminal and the call partner terminal and generates vibration corresponding to the movement of the call partner terminal, so as to enable the user of the mobile communication terminal and the call partner in communication with each other to share their emotion and feelings through the vibrations of the mobile communication terminal and the call partner terminal.

Also, the present disclosure has been made in an effort to provide a mobile communication terminal and a method, which compares one signal among an analog voice signal and a digital voice signal of a call partner with a voice information table already stored in the mobile communication terminal during a voice communication between the mobile communication terminal and a call partner terminal, and generates vibration according to a particular vibration pattern corresponding to particular voice information included in the voice information table when the particular voice information is detected in the compared signal among the analog voice signal and the digital voice signal of the call partner, so as to enable the user of the mobile communication terminal to feel the emotion of the call partner in voice communication through the vibration.

Also, the present disclosure has been made in an effort to provide a mobile communication terminal and a method for transferring vibration during a video communication, which can transfer vibration expressing emotion of a user of the mobile communication terminal to a call partner terminal during a video communication.

Also, the present disclosure has been made in an effort to provide a mobile communication terminal and a method for transferring vibration information corresponding to conditions set by a user of the mobile communication terminal to a call partner terminal or recognizing voice from the call partner and generating vibration corresponding to the recognized voice.

Technical Solution

In accordance with a first aspect of the present disclosure, there is provided a mobile communication terminal transferring vibration information, including: a display unit; a memory; an audio converter; a key input unit including a vibration transfer mode shift key for shifting of the mobile communication terminal into a vibration transfer mode, the key input unit generating and transferring a vibration transfer mode shift key input signal when there is an input of the vibration transfer mode shift key in a state of call connection between the mobile communication terminal and a call partner terminal; a motion sensor unit to detect a movement of the mobile communication terminal and generate and transfer a first movement detection signal, which is an analog signal corresponding to the movement of the mobile communication terminal; an A/D converter to convert a first movement detection signal, which is an analog signal, to first vibration information, which is a digital signal, or to convert second vibration information, which is a digital signal generated and transmitted by the call partner terminal, to a second movement detection signal, which is an analog signal corresponding to a movement of the call partner terminal; a vibration generator to receive the first movement detection signal or the second movement detection signal and generate vibration corresponding to the movement of the mobile communication terminal or the call partner terminal; a wireless circuit unit to transmit the first vibration information to the call partner terminal and to receive the second vibration information from the call partner terminal; and a controller to, upon receiving a vibration transfer mode shift key input signal from the key input unit), activate the motion sensor unit, receive the first movement detection signal from the motion sensor unit, transfer the first movement detection signal to the A/D converter and the vibration generator, and perform a control for transferring the first vibration information to the call partner terminal through the wireless circuit unit, and to, upon receiving the second vibration information through the wireless circuit unit during communication with the call partner terminal, transfer the second vibration information to the A/D converter and transfer the second movement detection signal converted by the A/D converter to the vibration generator.

In accordance with a first aspect of the present disclosure, there is provided a method of transferring vibration information during a voice communication by a mobile communication terminal including a key input unit, a motion sensor unit, a controller, a vibration generator, an A/D converter, and a wireless circuit unit, the method including: (a) during a voice communication with a call partner terminal, generating a vibration transfer mode shift key input signal and transferring the generated a vibration transfer mode shift key input signal to the controller by the key input unit; (b) activating the motion sensor unit by the controller, so as to cause the motion sensor unit to generate a movement detection signal, which is an analog signal corresponding to the detected movement of the mobile communication terminal; (c) transferring the generated movement detection signal to the controller by the motion sensor unit; (d) transferring the movement detection signal to the A/D converter and the vibration generator by the controller; (e) generating vibration corresponding to the movement of the mobile communication terminal by the vibration generator, and converting the movement detection signal to vibration information, which is a digital signal, and transferring the converted movement detection signal to the controller by the A/D converter; and (f) transmitting the vibration information to the call partner terminal through the wireless circuit unit 190 by the controller.

In accordance with a first aspect of the present disclosure, there is provided a method of receiving vibration information during a voice communication by a mobile communication terminal including a wireless circuit unit, an A/D converter, a controller, and a vibration generator, the method including: (a) during a voice communication with a call partner terminal, receiving vibration information, which is a digital signal generated and transmitted by a call partner terminal and transferring the received vibration information to the controller by the wireless circuit unit; (b) transferring the vibration information to the A/D converter by the controller; (c) converting the vibration information to a movement detection signal, which is an analog signal corresponding to a movement of the call partner terminal by the A/D converter; (d) transferring the movement detection signal to the vibration generator by the controller; and (e) generating vibration corresponding to the movement of the call partner terminal by the vibration generator.

In accordance with a second aspect of the present disclosure, there is provided a mobile communication terminal transferring emotion of a call partner, including: a display unit; a wireless circuit unit; a speaker and a microphone; a memory to store a voice information table, which contains one or more pieces of information among voice information and vibration pattern information corresponding to the voice information, the voice information including either analog voice signal information or digital voice signal information, each of which corresponds to voice; an audio converter to convert a user analog voice signal, which corresponds to voice of a user of the terminal input through the microphone, into a user digital voice signal, and to receive a call partner digital voice signal, which corresponds to voice of the call partner in communication with the mobile communication terminal, through the wireless circuit unit and convert the received call partner digital voice signal to a call partner analog voice signal; a key input unit including a voice recognition activation key for activating a voice recognition function of the mobile communication terminal and a voice information update key for updating the voice information table; a voice recognizer to, upon recognizing particular voice information included in the voice information table from one signal among the call partner digital voice signal and the call partner analog voice signal, extract particular vibration pattern information corresponding to the particular voice information from the voice information table and transfer the extracted vibration pattern information; a controller to activate the voice recognizer in response to an input of the voice recognition activation key, generate a vibration control signal corresponding to the particular vibration pattern information, and to update the voice information table in response to an input of the voice information update key; and a vibration generator to generate vibration corresponding to the generated vibration control signal.

In accordance with a second aspect of the present disclosure, there is provided a method for transferring emotion of a call partner in communication by a mobile communication terminal comprising a key input unit, a voice recognizer, a controller, a vibration generator, and a memory, the method including: comparing, by the voice recognizer, one signal among a call partner digital voice signal and a call partner analog voice signal, which corresponds to voice of the call partner, with a voice information table stored in the memory; when it is recognized that one signal among the call partner analog voice signal and the call partner digital voice signal matches with particular voice information included in the voice information table, extracting particular vibration pattern information corresponding to the recognized particular voice information from the voice information table and transferring the extracted particular vibration pattern information to the controller; generating a vibration control signal corresponding to the particular vibration pattern information and transferring the generated vibration control signal to the vibration generator by the controller; and generating vibration corresponding to the vibration control signal by the vibration generator.

In accordance with a third aspect of the present disclosure, there is provided a mobile communication terminal including: a vibration occurrence situation recognizer to recognize a vibration occurrence situation by comparing a signal transmitted from a call partner terminal or a signal input to the mobile communication terminal by a user during a video communication with a pre-configured vibration occurrence situation; a vibration condition searcher to search for vibration information, which matches with the vibration occurrence situation information recognized by the vibration occurrence situation recognizer, and to transfer the vibration information matching with the vibration occurrence situation information to the vibration information transmitter; and a vibration information transmitter to transmit the vibration information received from the vibration condition searcher to the call partner terminal in video communication. The mobile communication terminal may further include a vibration output unit to generate vibration corresponding to the vibration occurrence situation information searched by the vibration condition searcher when the signal is a signal transmitted from the call partner terminal during video communication.

The vibration occurrence situation recognizer comprises: an accelerometer/gyro recognizer to recognize movement of a mobile communication terminal during video communication and detect an acceleration and a rotation of the mobile communication terminal; a vocabulary recognizer to analyze a voice signal input by the user and a voice signal transmitted from the call partner terminal during the video communication, so as to identify a corresponding vocabulary; and a face recognizer to recognize a facial expression of the user through a camera provided at the mobile communication terminal during the video communication. The vibration condition searcher searches for vibration information, which matches with acceleration information or rotation information recognized by the accelerometer/gyro recognizer, and transfers matching vibration information to the vibration information transmitter when the vibration condition searcher has found matching vibration information matching with the acceleration information or the rotation information. The accelerometer/gyro recognizer recognizes a linear movement, a rotation, and an acceleration of the mobile communication terminal. The vibration condition searcher compares a vocabulary, which has been input by the user during a video communication and detected by the vocabulary recognizer, with vocabulary patterns set in advance to generate vibration, and, when there is a vocabulary pattern matching with the compared vocabulary, the vibration condition searcher transfers vibration information on the vocabulary pattern to the vibration information transmitter, so that the vibration information transmitter can transmit the vibration information to the call partner terminal. When a vocabulary received from a call partner terminal during a video communication and analyzed by the vocabulary recognizer matches with a vibration condition including a preset vocabulary pattern for generating vibration, the vibration condition searcher transfers vibration information of the vocabulary to the vibration output unit so that the vibration output unit can generate vibration relating to the vocabulary pattern. The vibration condition searcher determines if a facial expression of the user detected by the face recognizer coincides with facial expression patterns set in advance to generate vibration, and, when the facial expression of the user coincides with a preset facial expression pattern, the vibration condition searcher transfers vibration information of the preset facial expression to the vibration information transmitter.

In accordance with an alternative third aspect of the present disclosure, there is provided a mobile communication terminal including: a vibration condition configurator to output a pre-configured vibration condition setting menu and generate vibration information based on an input vibration condition when receiving a vibration request according to a user's selection during a video communication; and a vibration information transmitter to transmit the vibration information configured by the vibration condition configurator to a call partner terminal in video communication with the mobile communication terminal. The mobile communication terminal further includes a vibration information interpreter to analyze vibration information and identify vibration to output based on the analyzed vibration information when receiving the vibration information from the call partner terminal during the video communication; and a vibration output unit to generate vibration determined by the vibration information interpreter. When the vibration information transmitted from the call partner terminal has a form of a particular code, the vibration information interpreter extracts vibration information corresponding to the particular code from already stored vibration information; and when the vibration information transmitted from the call partner terminal has a form of detailed information including a vibration type, the vibration information interpreter transfers the vibration information to the vibration output unit.

In accordance with a third aspect of the present disclosure, there is provided a method for transferring vibration during video communication, the method including: during a video communication between a first mobile communication terminal and a second mobile communication terminal, recognizing, by the first mobile communication terminal, occurrence of a signal corresponding to vibration occurrence situation information; searching for and extracting vibration information matching with the vibration occurrence situation information by the first mobile communication terminal; and transmitting found vibration information to the second mobile communication terminal by the first mobile communication terminal. In recognizing of the occurrence of the signal, when the vibration occurrence situation information corresponds to a signal indicating movement of a mobile communication terminal, the first mobile communication terminal recognizes its own movement, acceleration, and rotation. In searching for and extracting of the vibration information, the first mobile communication terminal determines if there is vibration information corresponding to the acceleration or the rotation and extracts the corresponding vibration information when the corresponding vibration information is found as a result of the determination. In recognizing of the occurrence of the signal, when the vibration occurrence situation information corresponds to a voice signal input by the user, the first mobile communication terminal analyzes the input voice signal and determines a corresponding vocabulary. In searching for and extracting of the vibration information, the first mobile communication terminal compares the vocabulary determined in recognizing of the occurrence of the signal with vocabulary patterns pre-configured in order to generate vibration, so as to determine if there is a coinciding vocabulary pattern corresponding to the determined vocabulary, and extracts vibration information corresponding to the coinciding vocabulary pattern when the coinciding vocabulary pattern is found through the determination. In recognizing of the occurrence of the signal, when the vibration occurrence situation information corresponds to a facial expression signal, the first mobile communication terminal recognizes a facial expression of the user through a camera of the first mobile communication terminal during a video communication between the first mobile communication terminal and the second mobile communication terminal and determines if the recognized facial expression coincides with a facial expression pre-configured in order to generate vibration. In searching for and extracting of the vibration information, the first mobile communication terminal extracts vibration information corresponding to a pre-configured facial expression when the first mobile communication terminal has been determined that the facial expression of the user coincides with the pre-configured facial expression.

In accordance with an alternative third aspect of the present disclosure, there is provided a method for transferring vibration during video communication, the method including: during a video communication between a first mobile communication terminal and a second mobile communication terminal, when the first mobile communication terminal receives a vibration request according to a selection by a user, outputting a pre-configured vibration condition setting menu by the first mobile communication terminal; and generating vibration information based on a vibration condition input by the user and transmitting the generated vibration information to the second mobile communication terminal in video communication with the first mobile communication terminal by the first mobile communication terminal.

The method for transferring vibration during video communication further includes: after transmitting the vibration information to the second mobile communication terminal by the first mobile communication terminal, when the vibration information transmitted from the first mobile communication terminal has a form of a particular code, extracting vibration information corresponding to the particular code from the already stored vibration information and generating vibration corresponding to the extracted vibration information by the second mobile communication terminal; and when the vibration information transmitted from the first mobile communication terminal has a form of detailed information including a vibration type, generating vibration according to the vibration type by the second mobile communication terminal. The vibration information is transmitted in a form of H.245, by using User to User Signaling (UUS), by generating standards in Unstructured Supplementary Service Data (USSD), or in a form of a message discriminated from a typical Short Message Service (SMS) based on a particular port.

In accordance with another alternative third aspect of the present disclosure, there is provided a method for transferring vibration during video communication, the method including: during a video communication between a first mobile communication terminal and a second mobile communication terminal, analyzing a voice signal transmitted from the first mobile communication terminal and thereby determining a corresponding vocabulary by the second mobile communication terminal; comparing the determined vocabulary with vocabulary patterns pre-configured in order to generate vibration, so as to determine if there is a coinciding vocabulary pattern corresponding to the determined vocabulary by the second mobile communication terminal; and when there is a coinciding vocabulary pattern corresponding to the determined vocabulary, generating vibration corresponding to the coinciding vocabulary pattern by the second mobile communication terminal.

Advantageous Effects

According to the first embodiment of the present disclosure as described above, when a user rocks a mobile communication terminal according to the user's feeling or emotion during a voice communication between the user and a call partner, the mobile communication terminal detects the rocking and transmits vibration information corresponding to the rocking of the mobile communication terminal to the call partner terminal, so as to generate vibration corresponding to the rocking of the mobile communication terminal in the call partner terminal. Therefore, by the present disclosure, the user of the mobile communication terminal and the call partner in voice communication can share their emotion and feelings through vibration.

According to the second embodiment of the present disclosure, when the voice of a call partner in voice communication with a mobile communication terminal includes a predetermined word or phrase expressing an emotion of the call partner, the mobile communication terminal detects the predetermined word or phrase and generates vibration in a different (specific) vibration pattern depending on the predetermined word or phrase, so as to enable the user of the mobile communication terminal to feel the emotion of the call partner in voice communication through the vibration. Further, the mobile communication terminal provides a voice information editing function, so as to enable a user to edit particular voice information and vibration pattern information corresponding to the particular voice information, which enables a user of the mobile communication terminal to select an emotion of the call partner to receive.

According to the third embodiment of the present disclosure, a mobile communication terminal can transfer vibration expressing an emotion of a user of the mobile communication terminal to a call partner terminal during a video communication. Also, the mobile communication terminal can transfer vibration information corresponding to conditions set by the user of the mobile communication terminal to the call partner terminal or can recognize a voice from the call partner and generate vibration corresponding to the recognized voice.

DESCRIPTION OF DRAWINGS

The drawings described herein are for illustration purposes only and are not intended to limit the scope of the present disclosure in any way.

FIG. 6 illustrates an example of a voice information table according to the second embodiment of the present disclosure;

FIG. 11 illustrates an example of a method of generating vibration according to the third embodiment of the present disclosure in more detail;

FIG. 12 illustrates another example of a method of generating vibration according to the third embodiment of the present disclosure in more detail;

MODE FOR INVENTION

Figure 1:
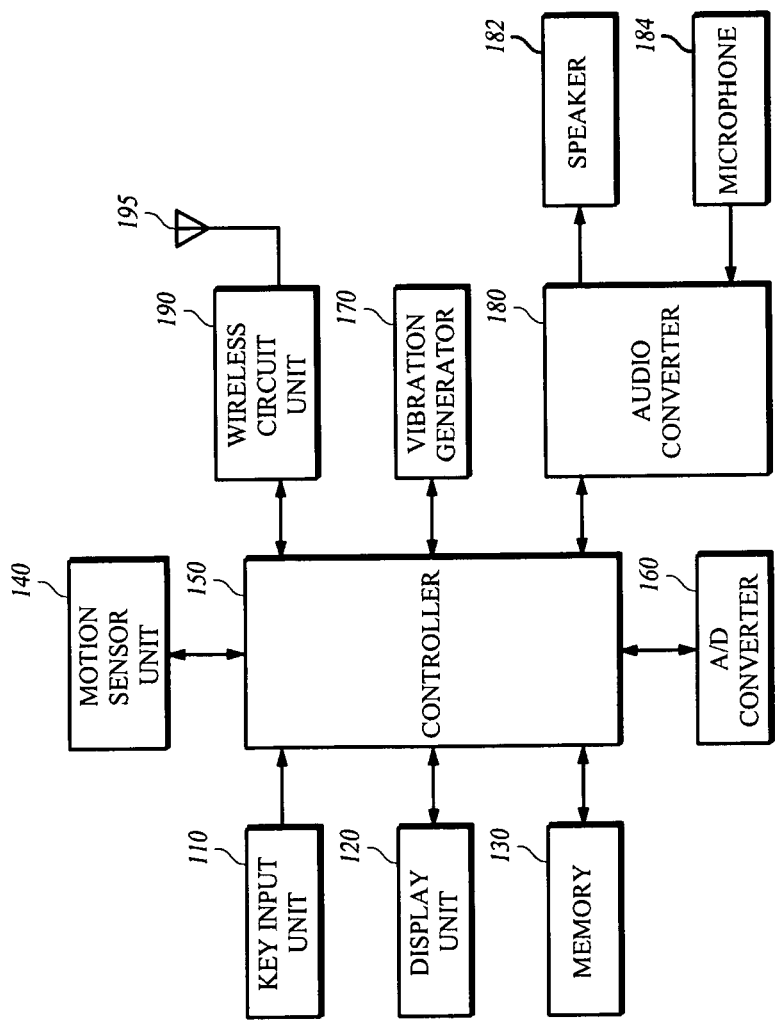
FIG. 1 is a block diagram schematically illustrating an internal structure of a mobile communication terminal according to the first embodiment of the present disclosure.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is a block diagram schematically illustrating an internal structure of a mobile communication terminal according to the first embodiment of the present disclosure.

The mobile communication terminal 100 according to the first embodiment of the present disclosure includes a key input unit 110, a display unit 120, a memory 130, a motion sensor unit 140, a controller 150, an analog-to-digital (A/D) converter 160, a vibration generator 170, an audio converter 180, and a wireless circuit unit 190.

The key input unit 110 is an input means for receiving a command from a user of the mobile communication terminal and transferring the command to the controller 150, and includes function buttons for executing functions of the mobile communication terminal and normal buttons for input of letters or numbers.

In the first embodiment of the present disclosure, the key input unit 110 includes a vibration transfer mode shift key, which is a key for shifting of the mobile communication terminal 100 into a vibration transfer mode. When there is an input of the vibration transfer mode shift key by a user in a state of call connection between the mobile communication terminal 100 and a call partner terminal (not shown), the key input unit 110 generates a vibration transfer mode shift key input signal and transfers the generated vibration transfer mode shift key input signal to the controller 150. The vibration transfer mode refers to a mode in which a mobile communication terminal generates vibration information and transfers the generated vibration information to a call-connected partner terminal (not shown) while the mobile communication terminal is in communication.

The display unit 120 provides, under the control of the controller 150, various screens including an information screen displaying information of the mobile communication terminal 100, a menu screen for input of letters or numbers, an editing screen for editing of a picture or photograph, and a screen for access to the wireless Internet.

The memory 130 stores, for example, a program for executing a function processed by the controller 150 and predetermined programs for implementing various basic functions in pursuit of users' convenience.

The motion sensor unit 140 is activated under the control of the controller 150, detects a movement of the mobile communication terminal 100 when a user shakes the mobile communication terminal 100, generates a first movement detection signal, which is an analog signal corresponding to the detected movement, and transfers the generated first movement detection signal to the controller 150. The motion sensor unit 140 includes one or more sensors among an acceleration sensor, an angular velocity sensor, a geomagnetic sensor, and a gyro sensor.

The controller 150 executes operation programs stored in the memory 130 according to indications by the user of the mobile communication terminal input through the key input unit 110, so as to control a communication service and various menu items including phone book, mobile phone setting, schedule management, game, screen configuration, sound quantity, and ringtone.

In the first embodiment of the present disclosure, upon receiving a vibration transfer mode shift key input signal from the key input unit 110 during a voice communication between the mobile communication terminal and a call partner terminal (not shown), the controller 150 activates the motion sensor unit 140, receives a movement detection signal from the motion sensor unit 140, transfers the movement detection signal to the A/D converter 160 and the vibration generator 170, and performs a control for transferring first vibration information generated by the A/D converter 160 to a call partner terminal (not shown) connected through a mobile communication network 220, which will be described later. Here, the controller 150 may generate a first vibration information flag, which is information for enabling the call partner terminal (not shown) to recognize that the data transmitted through the mobile communication network 220 during the communication is first vibration information, and transmit the first vibration information flag together with the first vibration information.

In the first embodiment of the present disclosure, it is preferred that the first vibration information is transmitted in one message format among the UUS (User to User Signaling) message format and the USSD (Unstructured Supplementary Service Data) message format. However, the present disclosure is not limited to those message formats.

Further, upon receiving second vibration information, which is vibration information generated and transmitted by a call partner terminal (not shown), through the wireless circuit unit 190 during communication with the call partner terminal, the controller 150 causes the A/D converter 160 to convert the second vibration information to a second movement detection signal, which is a movement detection signal of the call partner terminal, and transfers the second movement detection signal converted by the A/D converter 160 to the vibration generator 170. At this time, by identifying a second vibration information flag received together with the second vibration information, the controller 150 can identify that the data received from the call partner terminal is the second vibration information. Further, when the call partner terminal is the same model as a mobile communication terminal 100 according to an embodiment of the present disclosure, the second vibration information can be received from the call partner terminal.

In the first embodiment of the present disclosure, it is preferred that the second vibration information is transmitted in one message format among the UUS (User to User Signaling) message format and the USSD (Unstructured Supplementary Service Data) message format. However, the present disclosure is not limited to those message formats.

The A/D converter 160 converts an analog signal to a digital signal or converts a digital signal to an analog signal.

In the first embodiment of the present disclosure, the A/D converter 160 converts a first movement detection signal, which is an analog signal, to first vibration information, which is a digital signal, or converts second vibration information, which is a digital signal generated and transmitted by a call partner terminal, to a second movement detection signal, which is an analog signal corresponding to the motion of the call partner terminal.

The vibration generator 170 generates vibration under the control of the controller 150. In other words, the vibration generator 170 receives a first movement detection signal or a second movement detection signal from the controller 150 and generates vibration corresponding to the movement of the call partner terminal.

The audio converter 180 modulates a voice signal input from a microphone 184 into voice data, and demodulates voice data input from the wireless circuit unit 190 into a voice signal and outputs the voice signal through a speaker 182.

The wireless circuit unit 190 demodulates and amplifies a Radio Frequency (RF) signal received through an antenna 195, and modulates an outgoing signal applied from the audio converter 180 and transmits the modulated outgoing signal to the mobile communication network 220.

In the first embodiment of the present disclosure, the wireless circuit unit 190 transmits first vibration information to a call partner terminal through the mobile communication network 220, and receives second vibration information from the call partner terminal and transfers the received second vibration information to the controller 150.

Figure 2:
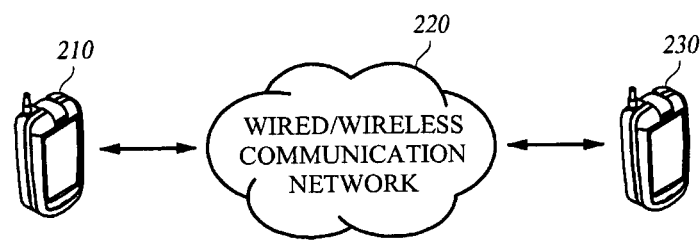
FIG. 2 illustrates a simplified construction of a system for transferring vibration information during a voice communication by using a mobile communication terminal according to the first embodiment of the present disclosure.

FIG. 2 illustrates a simplified construction of a system for transferring vibration information during a voice communication by using a mobile communication terminal according to the first embodiment of the present disclosure.

While a first terminal 210 and a second terminal 230, each of which corresponds to a mobile communication terminal 100 according to the first embodiment of the present disclosure, are in voice communication with each other through the mobile communication network 220, if the first terminal 210 generates vibration information corresponding to rocking of the first terminal 210 and transmits the generated vibration information to the second terminal 230, which is a call partner terminal, through the second terminal 230 in a state in which a vibration transfer mode shift key of the first terminal 210 has been input, the second terminal 230 generates vibration corresponding to the rocking of the first terminal 210.

In the present embodiment as described above, since the first terminal 210 and the second terminal 230 can share vibration information occurring in one of the two terminals, each of the users of the first terminal and the second terminal can transfer their feelings and emotion to the other party through the vibration of the terminal.

Figure 3:
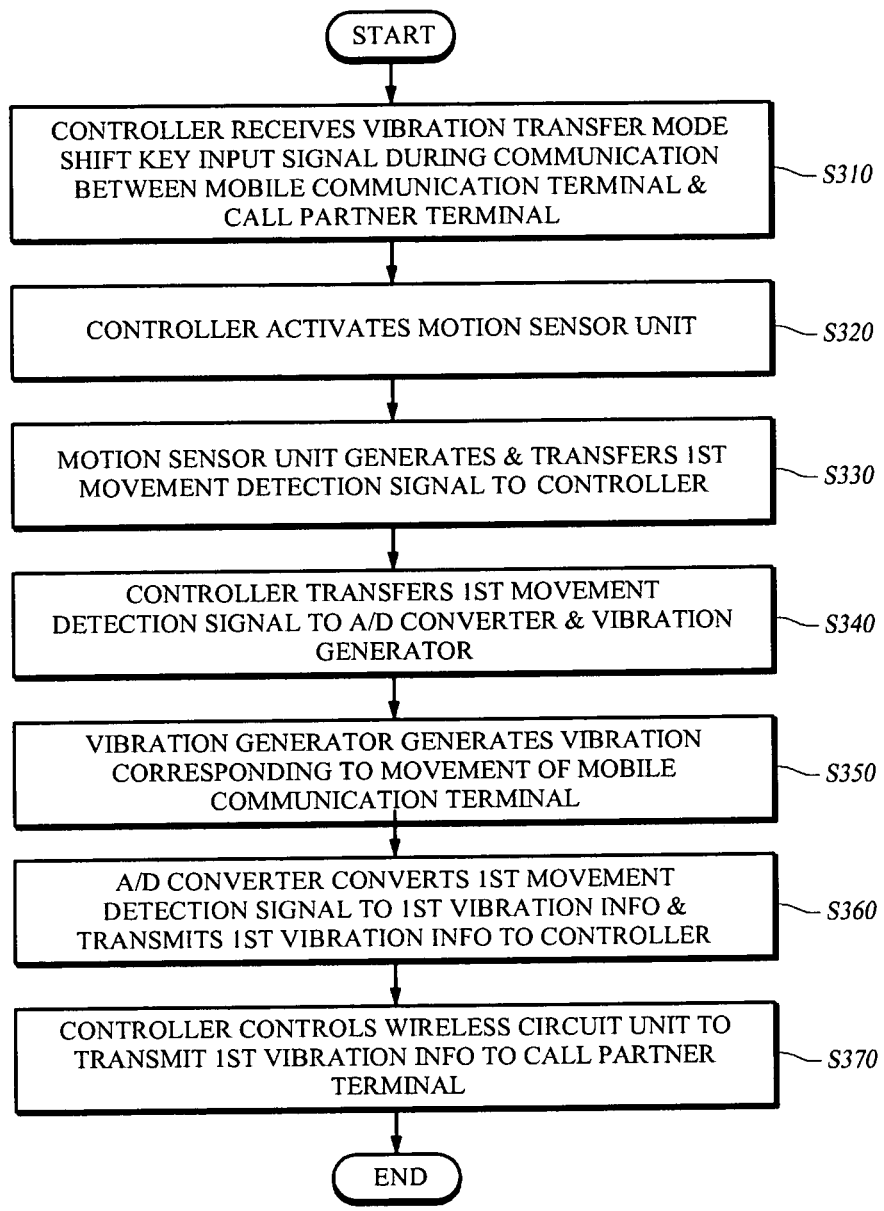
FIG. 3 is a flowchart showing a process of transmitting vibration information by a mobile communication terminal during voice communication according to the first embodiment of the present disclosure.

FIG. 3 is a flowchart showing a process of transmitting vibration information by a mobile communication terminal during voice communication according to the first embodiment of the present disclosure.

If the key input unit 110 of the mobile communication terminal generates a vibration transfer mode shift key input signal and transfers the generated vibration transfer mode shift key input signal to the controller 150 during voice communication between the mobile communication terminal and a call partner terminal, the controller 150 receives the vibration transfer mode shift key input signal and activates the motion sensor unit 140 (steps S310 and S320).

Next, the activated motion sensor unit 140 generates a first movement detection signal, which is an analog signal corresponding to the detected movement, and transfers the generated first movement detection signal to the controller 150, and the controller 150 then transfers the first movement detection signal to the A/D converter 160 and the vibration generator 170 (steps S330 and S340).

From among the vibration generator 170 and the A/D converter 160 having received the first movement detection signal from the controller 150, the vibration generator 170 generates vibration corresponding to the movement of the mobile communication terminal 100, and the A/D converter 160 converts a first movement detection signal, which is an analog signal, to first vibration information, and transfers the converted first vibration information to the controller 150 (steps S350 and S360).

Thereafter, the controller 150 performs a control for transferring the first vibration information received from the A/D converter 160 to a call partner terminal (not shown) in voice communication through the wireless circuit unit 190 (step S370). Here, the controller 150 may generate a first vibration information flag, which is information for enabling the call partner terminal to recognize that the data transmitted through the mobile communication network 220 during the communication is the first vibration information, and transmit the first vibration information flag together with the first vibration information. Further, the controller 150 may transmit the first vibration information in a UUS message format.

Figure 4:
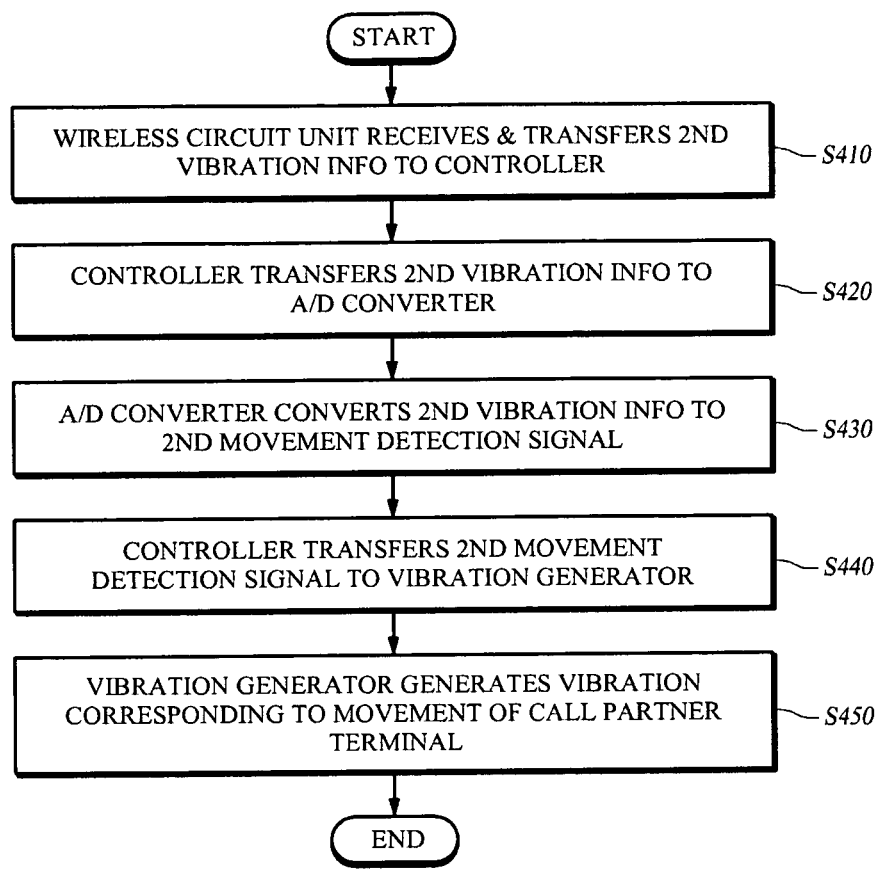
FIG. 4 is a flowchart showing a process of receiving vibration information by a mobile communication terminal during voice communication according to the first embodiment of the present disclosure.

FIG. 4 is a flowchart showing a process of receiving vibration information by a mobile communication terminal during voice communication according to the first embodiment of the present disclosure.

If the wireless circuit unit 190 of the mobile communication terminal receives second vibration information, which is a digital signal generated and transmitted by a call partner terminal (not shown), and transfers the received second vibration information to the controller 150 during voice communication between the mobile communication terminal and a call partner terminal, the controller 150 transfers the second vibration information to the A/D converter 160 (steps S410 and S420). Here, the wireless circuit unit 190 may receive a second vibration information flag, which is information for enabling the controller 150 to recognize that the data received from the call partner terminal is the second vibration information, together with the second vibration information.

Next, the A/D converter 160 converts the second vibration information to a second movement detection signal, which is an analog signal corresponding to the movement of the call partner terminal, and the controller 150 then transfers the second movement detection signal to the vibration generator 170, causing the vibration generator 170 to generate vibration corresponding to the call partner terminal (steps S430, S440, and S450).

When the call partner terminal is the same model as a mobile communication terminal 100 according to an embodiment of the present disclosure, the mobile communication terminal 100 can receive the second vibration information from the call partner terminal.

Figure 5:
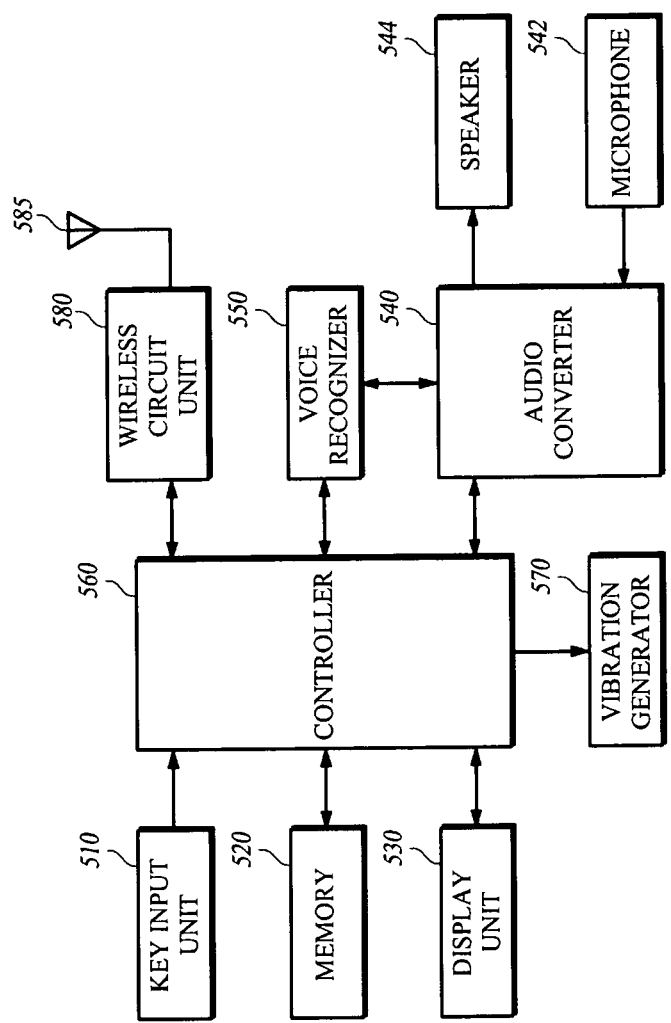
FIG. 5 is a block diagram schematically illustrating an internal structure of a mobile communication terminal according to the second embodiment of the present disclosure.

FIG. 5 is a block diagram schematically illustrating an internal structure of a mobile communication terminal according to the second embodiment of the present disclosure.

The mobile communication terminal 500 according to the second embodiment of the present disclosure includes a key input unit 510, a display unit 530, a memory 520, an audio converter 540, a voice recognizer 550, a controller 560, a vibration generator 570, and a wireless circuit unit 580.

The key input unit 510 is an input means for receiving a command from a user of the mobile communication terminal and transferring the command to the controller 560, and includes function buttons for executing functions of the mobile communication terminal and normal buttons for inputting letters or numbers.

In the second embodiment of the present disclosure, the key input unit 110 includes a voice recognition activation key for activating the voice recognition function of the mobile communication terminal 500 and a voice information update key for updating a voice information table stored in the memory 520, which will be described later in more detail.

When a voice recognition activation key is input by a user of the terminal, the key input unit 510 generates a voice recognition activation key input signal and transfers the voice recognition activation key input signal to the controller 560. When a voice information update key is input by the user of the terminal, the key input unit 510 generates a voice information update key input signal and transfers the voice information update key input signal to the controller 560.

The memory 520 stores a program for executing a function processed by the controller 560 and predetermined programs for implementing various basic functions in pursuit of users' convenience.

In the second embodiment of the present disclosure, the memory 520 stores a voice information table, which contains voice information (including analog voice signal information or digital voice signal information corresponding to a voice) and vibration pattern information corresponding to the voice information. Here, the voice may be a voice corresponding to a predetermined word or phrase as shown in FIG. 6, although the present disclosure is not limited thereto. In other words, the voice may be a voice corresponding to a sentence.

The display unit 530 provides, under the control of the controller 560, various screens including an information screen displaying information of the mobile communication terminal 500, a menu screen for inputting letters or numbers, an editing screen for editing a picture or photograph, and a screen for accessing the wireless Internet.

Figure 7:
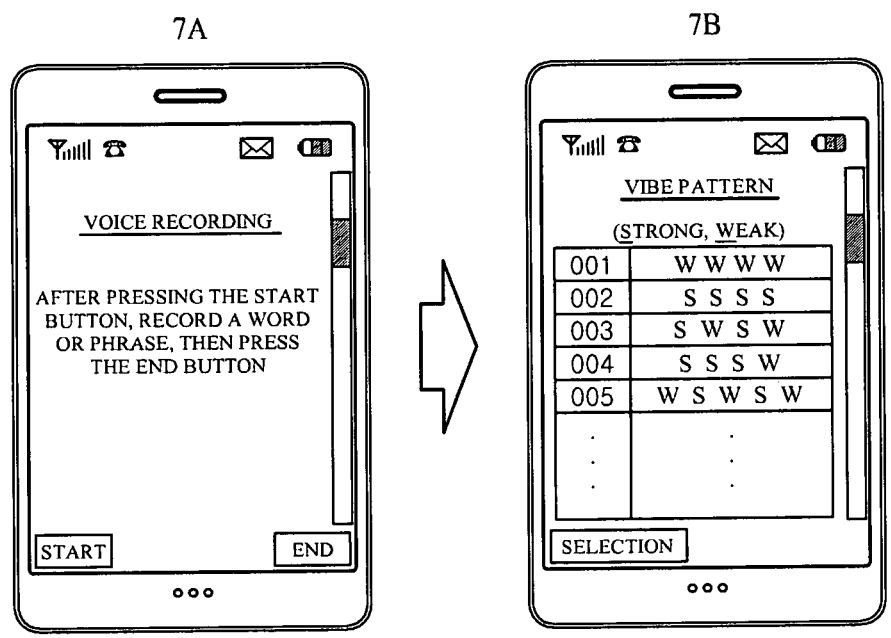
FIGS. 7A and 7B illustrate examples of voice information editing screens in a mobile communication terminal according to the second embodiment of the present disclosure.

In the second embodiment of the present disclosure, when a voice information update key of the key input unit 510 is input, the display unit 530 displays, under the control of the controller 560, a voice information update screen for updating of the voice information table as shown in FIGS. 7A and 7B.

The audio converter 540 converts a user analog voice signal, which is an analog voice signal corresponding to the voice of the user of the terminal input through the microphone 542, into a user digital voice signal. Also, the audio converter 540 receives a call partner digital voice signal, which is a digital voice signal corresponding to the voice of the call partner in communication with the mobile communication terminal, through the wireless circuit unit 580, converts the received call partner digital voice signal to a call partner analog voice signal, which is an analog voice signal, and outputs the converted analog voice signal through a speaker 544.

When the voice recognizer 550 recognizes particular voice information included in the voice information table from one signal among the call partner digital voice signal and the call partner analog voice signal, the voice recognizer 550 extracts particular vibration pattern information corresponding to the particular voice information from the voice information table and transfers the extracted vibration pattern information to the controller 560. Here, when a voice recognition activation key of the key input unit 510 is input, the voice recognizer 550 is activated by a control of the controller 560 and compares one signal among the call partner digital voice signal and the call partner analog voice signal with the voice information table stored in the memory 520 in order to recognize the particular voice information from one signal among the call partner digital voice signal and the call partner analog voice signal.

In the second embodiment of the present disclosure, when the voice information includes digital voice signal information, the voice recognizer 550 recognizes particular digital voice signal information included in the voice information table from the call partner digital voice signal, extracts particular vibration pattern information corresponding to the particular digital voice signal information from the voice information table, and transfers the extracted particular vibration pattern information to the controller 560. Here, the voice recognizer 550 compares the call partner digital voice signal with one or more pieces of digital voice signal information included in the voice information table. As a result of the comparison, if a digital voice signal having a similarity higher than a predetermined value with respect to the particular digital voice signal information is found in the call partner digital voice signal, the voice recognizer 550 can recognize the found digital voice signal as the particular digital voice signal information.

In the meantime, when the voice information includes analog voice signal information, the voice recognizer 550 recognizes particular analog voice signal information included in the voice information table from the call partner analog voice signal, extracts particular vibration pattern information corresponding to the particular analog voice signal information from the voice information table, and transfers the extracted particular vibration pattern information to the controller 560. Here, the voice recognizer 550 compares the call partner analog voice signal with one or more pieces of analog voice signal information included in the voice information table. As a result of the comparison, if an analog voice signal having a similarity higher than a predetermined value with respect to the particular analog voice signal information is found in the call partner analog voice signal, the voice recognizer 550 can recognize the found analog voice signal as the particular analog voice signal information.

The controller 560 executes operation programs stored in the memory 520 according to indications input through the key input unit 510 by the user of the mobile communication terminal, so as to control a communication service and various menu items including phone book, mobile phone setting, schedule management, game, screen configuration, sound quantity, and ringtone.

In the second embodiment of the present disclosure, when a voice recognition activation key is input, the controller 560 performs a control for updating voice information table as described below.

When a voice recognition activation key is input while the mobile communication terminal 500 is in a standby state, in other words, while the mobile communication terminal 500 is not in communication with a call partner terminal, the controller 560 extracts one of a user analog voice signal and a user digital voice signal from the audio converter 540, generates user voice information from the extracted signal, matches the user voice information to user selection vibration pattern information, which is vibration pattern information selected by the user of the terminal, and updates the voice information table based on the matching. Here, the user voice information corresponds to either digital voice signal information or analog voice signal information.

In contrast, when a voice recognition activation key is input while the mobile communication terminal 500 is in communication with a call partner terminal, the controller 560 extracts one of a call partner digital voice signal and a call partner analog voice signal from the audio converter 540, generates call partner voice information from the extracted signal, matches the call partner voice information to user selection vibration pattern information, and updates the voice information table based on the matching. Here, the call partner voice information corresponds to either digital voice signal information or analog voice signal information.

The vibration generator 570 generates vibration under the control of the controller 560. In other words, the vibration generator 570 receives a vibration control signal from the controller 560 and generates vibration corresponding to the vibration control signal.

The wireless circuit unit 580 demodulates and amplifies a call partner digital voice signal received through an antenna 585, and modulates a user digital voice signal applied from the audio converter 540 and transmits the modulated signal to a mobile communication network (not shown).

FIG. 6 shows an example of a voice information table according to the second embodiment of the present disclosure.

A voice information table according to an embodiment of the present disclosure includes a user analog voice signal, a user digital voice signal, a call partner analog voice signal, or a call partner digital voice signal, each of which corresponds to a word or phrase (for example, "I love you", "Fool", "What?", "It's annoying", "Hey!", and "Nice" as shown in FIG. 6) capable of expressing feelings or emotion of the user or the call partner, and vibration pattern information corresponding to the user analog voice signal, the user digital voice signal, the call partner analog voice signal, or the call partner digital voice signal. Here, the mobile communication terminal 500 may either store information on a plurality of vibration patterns in advance or download information on one or more vibration patterns through a mobile communication network (not shown).

FIGS. 7A and 7B illustrate examples of voice information editing screens displayed in a mobile communication terminal according to the second embodiment of the present disclosure.

When a voice information update key of the mobile communication terminal 500 is input by a user of the mobile communication terminal 500 while the mobile communication terminal 500 is in communication with a call partner terminal or in a standby state, the mobile communication terminal 500 displays a screen for recording voice information as shown in FIG. 7A. Then, after the user of the mobile communication terminal 500 inputs (touches or presses) the start button, if a voice of the user of the terminal or the call partner in communication corresponding to a certain word or phrase is input, the mobile communication terminal 500 stores the input voice as voice information.

Thereafter, if the end button is input by the user of the terminal, the mobile communication terminal 500 displays a plurality of vibration patterns as shown in FIG. 7B. Then, if the user of the terminal selects a particular vibration pattern from the plurality of vibration patterns, the mobile communication terminal 500 matches the voice information to the selected vibration pattern and updates the matched vibration information and particular vibration pattern in the voice information table.

Figure 8:
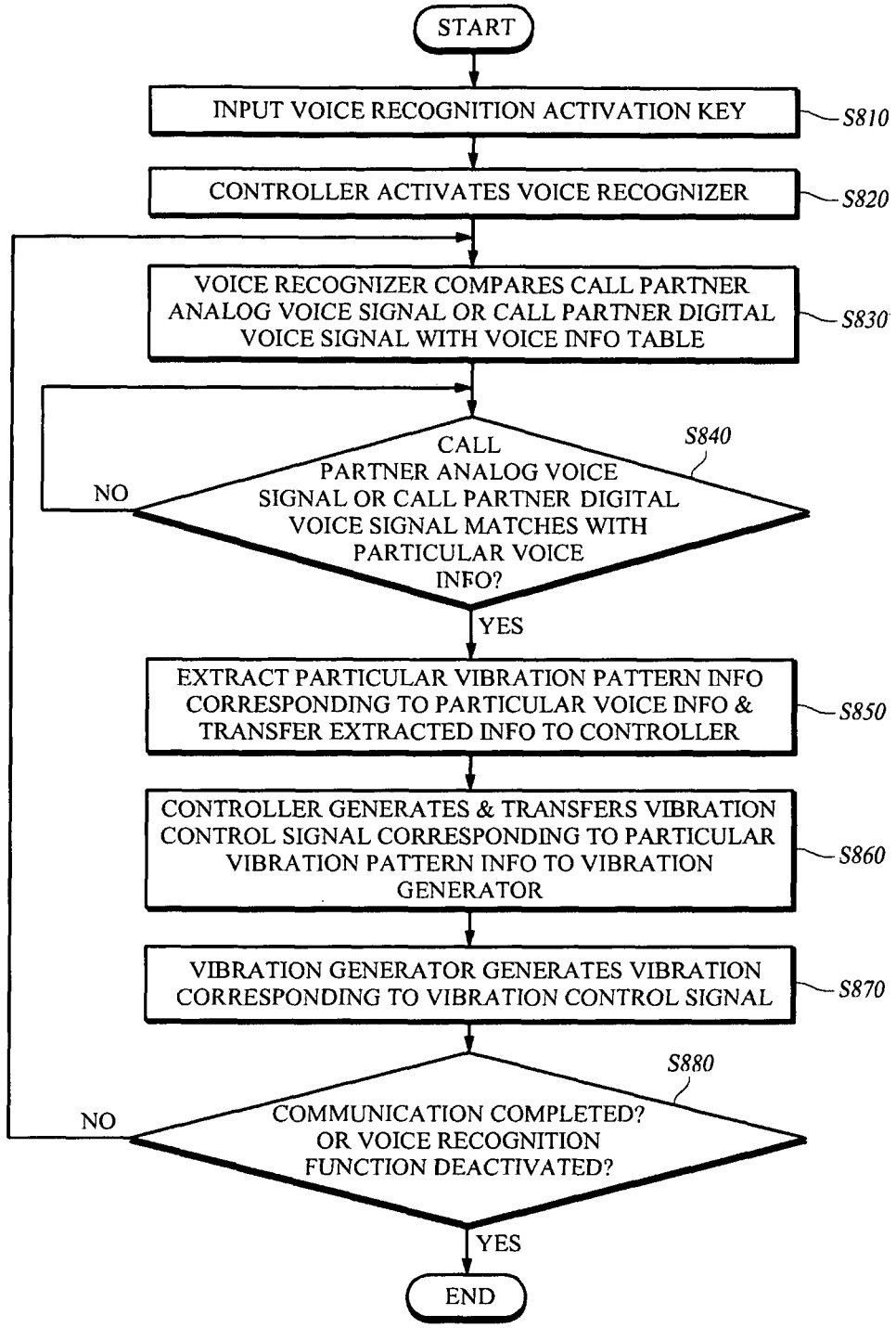
FIG. 8 is a flowchart illustrating a process of transferring emotion of a call partner in communication in a mobile communication terminal according to the second embodiment of the present disclosure.

FIG. 8 is a flowchart illustrating a process of transferring emotion of a call partner in communication in a mobile communication terminal according to the second embodiment of the present disclosure.

In a state in which the mobile communication terminal is in voice communication with a call partner terminal, if a voice recognition activation key of the key input unit 510 is input, the controller 560 activates the voice recognizer 550 (steps S810 and S820).

The activated voice recognizer 550 compares a call partner analog voice signal or a call partner digital voice signal corresponding to a voice of the communicating call partner with the voice information table stored in the memory 520. As a result of the comparison, if it is recognized that the call partner analog voice signal or the call partner digital voice signal matches with particular voice information included in the voice information table, the voice recognizer 550 extracts particular vibration pattern information corresponding to the recognized particular voice information from the voice information table and transfers the extracted particular vibration pattern information to the controller 560 (steps S830, S840, and S850). Here, the voice information table may contain one or more pieces of voice information (including analog voice signal information or digital voice signal information of a voice corresponding to a predetermined word or phrase) and one or more pieces of vibration pattern information corresponding to the voice information.

The controller 560 generates a vibration control signal corresponding to the particular vibration pattern information and transfers the generated vibration control signal to the vibration generator 570, so as to cause the vibration generator 570 to generate vibration corresponding to the vibration control signal (steps S860 and S870).

Until the communication with the call partner terminal is completed or the voice recognition function of the mobile communication terminal is deactivated by the user of the mobile communication terminal, the mobile communication terminal 500 repeatedly performs steps S803 to S860 (step S880).

In step S840, if the voice information includes the digital voice signal information, the voice recognizer 550 compares the call partner digital voice signal with one or more pieces of digital voice signal information included in the voice information table. In contrast, if the voice information includes the analog voice signal information, the voice recognizer 550 compares the call partner analog voice signal with one or more pieces of analog voice signal information included in the voice information table.

As described above, when the voice of a call partner in voice communication with the mobile communication terminal 500 includes a predetermined word or phrase expressing an emotion of the call partner, the mobile communication terminal 500 according to the second embodiment of the present disclosure detects the predetermined word or phrase and generates vibration in a different (specific) vibration pattern depending on the predetermined word or phrase, so as to enable the user of the mobile communication terminal to feel the emotion of the call partner in voice communication through the vibration.

Figure 9:
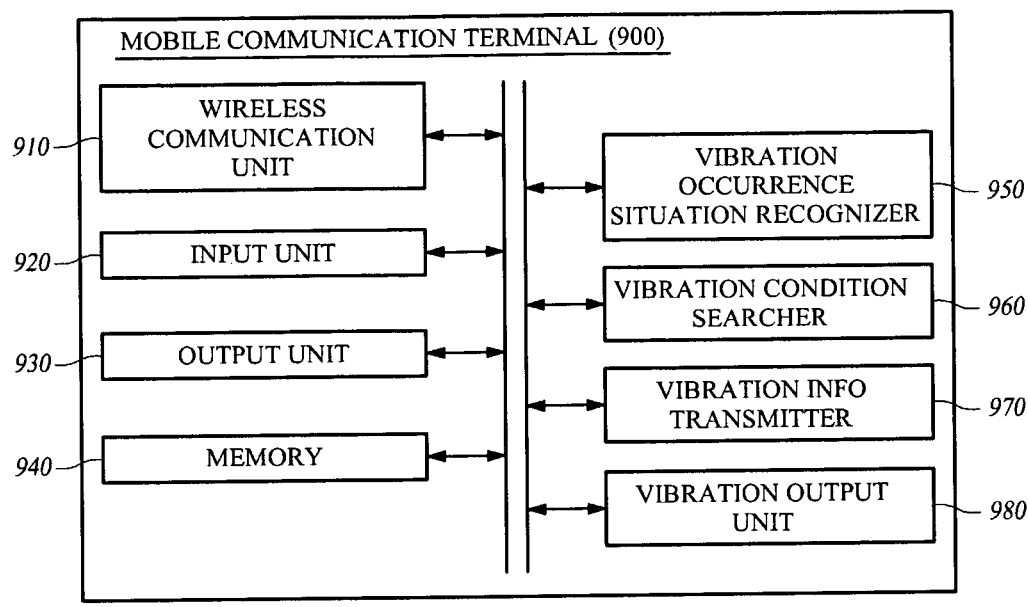
FIG. 9 illustrates a construction of a mobile communication terminal according to the third embodiment of the present disclosure.

FIG. 9 illustrates a construction of a mobile communication terminal according to the third embodiment of the present disclosure.

As shown, the mobile communication terminal 900 includes a wireless communication unit 910, an input unit 920, an output unit 930, a memory 940, a vibration occurrence situation recognizer 950, a vibration condition searcher 960, a vibration information transmitter 970, and a vibration output unit 980.

The wireless communication unit 910 for communication through a communication network, the input unit 920 for input control, the output unit 930 for visually or auditorily providing data required for a voice communication service or a data service, and the memory 940 for storing information relating to the mobile communication terminal are elements included in a typical mobile communication terminal also, so a more detailed description thereof will be omitted here.

The vibration occurrence situation recognizer 950 recognizes a vibration occurrence situation by comparing a signal transmitted from the call partner terminal or a signal input to the mobile communication terminal by the user during a video communication with a pre-configured vibration occurrence situation.

Figure 10:
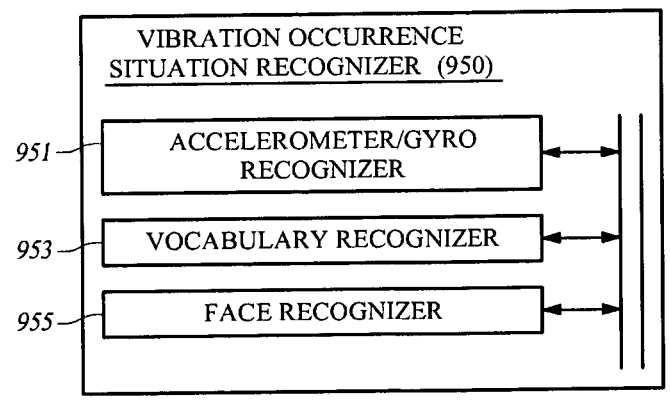
FIG. 10 illustrates the construction of the vibration occurrence situation recognizer according to the third embodiment of the present disclosure in more detail.

In more detail with reference to FIG. 10, the vibration occurrence situation recognizer 950 includes an accelerometer/gyro recognizer 951 for recognizing movement of a mobile communication terminal during video communication and detecting an acceleration and a rotation of the mobile communication terminal, a vocabulary recognizer 953 for analyzing a voice signal input by the user and a voice signal transmitted from the call partner terminal during the video communication, so as to identify a corresponding vocabulary, and a face recognizer 955 for recognizing a facial expression of the user through a camera provided at the mobile communication terminal during the video communication.

The accelerometer/gyro recognizer 951 recognizes a linear movement, a rotation, and an acceleration of the mobile communication terminal.

The accelerometer/gyro recognizer 951 detects the acceleration along one axis when the acceleration is measured in only one direction. However, when the acceleration is measured in three directions along the x axis, y axis, and z axis in three dimensional space, the accelerometer/gyro recognizer 951 individually detects accelerations along the three axes including the x axis, y axis, and z axis. In other words, when the accelerometer/gyro recognizer 951 is disposed based on the three axes, which implies that it can measure three axis angular velocities, the accelerometer/gyro recognizer 951 detects the angular velocities in three dimensional space. Further, in recognizing the magnitudes of the accelerations and the angular velocities, an accelerometer/gyro recognizer having a high resolution is implemented and used to measure the accelerations and the angular velocities.

Meanwhile, the recognition of a vocabulary by the vocabulary recognizer 953 includes a recognition of a vocabulary in a voice input by the user through a voice input unit (e.g. microphone; not shown) and a recognition of a vocabulary in a voice transmitted from the call partner terminal.

For example, the vocabulary recognizer 953 recognizes the vocabulary corresponding to the voice input through a voice input unit (e.g. microphone; not shown) of the mobile communication terminal by comparing and analyzing a waveform of the input voice with vocabulary patterns stored in advance, or recognizes the vocabulary corresponding to the voice transmitted from the call partner terminal by comparing and analyzing a waveform of the transmitted voice with vocabulary patterns stored in advance.

The face recognizer 955 catches an instant in which a predetermined facial expression (for example, a smiling face, an angry face, or a crying face) is made by a user, by recognizing the face of the user taken by a camera provided at the mobile communication terminal.

It goes without saying that it is possible to employ another method in order to recognize the face of the user as well as the method described above.

The vibration condition searcher 960 searches for vibration information, which matches with the vibration occurrence situation information recognized by the vibration occurrence situation recognizer 950. When the vibration condition searcher 960 has found vibration information matching with the vibration occurrence situation information, the vibration condition searcher 960 transfers the found vibration information to the vibration information transmitter 970.

In more detail, the vibration condition searcher 960 searches for vibration information, which matches with the acceleration information or rotation information recognized by the accelerometer/gyro recognizer 951. Then, when the vibration condition searcher 960 has found matching vibration information, the vibration condition searcher 960 transfers the found vibration information to the vibration information transmitter 970.

For example, as shown in FIG. 11, when the acceleration information or rotation information recognized by the accelerometer/gyro recognizer 951 is "leftward, rightward, upward, . . . ", the vibration condition searcher 960 searches for and extracts vibration information matching with "leftward, rightward, upward, . . . ".

Here, the vibration information may have either a form of codes, such as 0x01, 0x02, and 0x03, or a form of detailed information including the vibration type, such as short weak vibration, long weak vibration, and short strong vibration.

If the vibration information transmitted to the call partner terminal has a form of codes, it is indispensable that vibration type information matching with the vibration codes should be also stored in advance in the call partner terminal.

Further, the vibration condition searcher 960 compares the vocabulary, which has been input by the user during a video communication and detected by the vocabulary recognizer 953, with the vocabulary patterns set in advance. As a result of the comparison, when there is a vocabulary pattern matching with the compared vocabulary, the vibration condition searcher 960 transfers vibration information on the vocabulary pattern to the vibration information transmitter 970, so that the vibration information transmitter 970 can transmit the vibration information to the call partner terminal.

For example, if a vocabulary recognized by the vocabulary recognizer 953 is "Hello", "Hi", or "Good Night" as shown in FIG. 12, the vibration condition searcher 960 extracts vibration information (a vibration code or vibration type matching with the recognized vocabulary and transmits the extracted vibration information to the vibration information transmitter 970.

In addition, if a vocabulary received from a call partner terminal during a video communication and analyzed by the vocabulary recognizer 953 matches with a vibration condition including a preset vocabulary pattern for generating vibration, the vibration condition searcher 960 transfers vibration information of the vocabulary to the vibration output unit 980 so that the vibration output unit 980 can generate vibration relating to the vocabulary pattern.

The vibration condition searcher 960 determines if the facial expression of the user detected by the face recognizer 955 coincides with a preset facial expression pattern for generating vibration. As a result of the determination, when the face of the user coincides with a preset facial expression pattern, the vibration condition searcher 960 transfers vibration information of the facial expression to the vibration information transmitter 970.

Figures 13, 14:
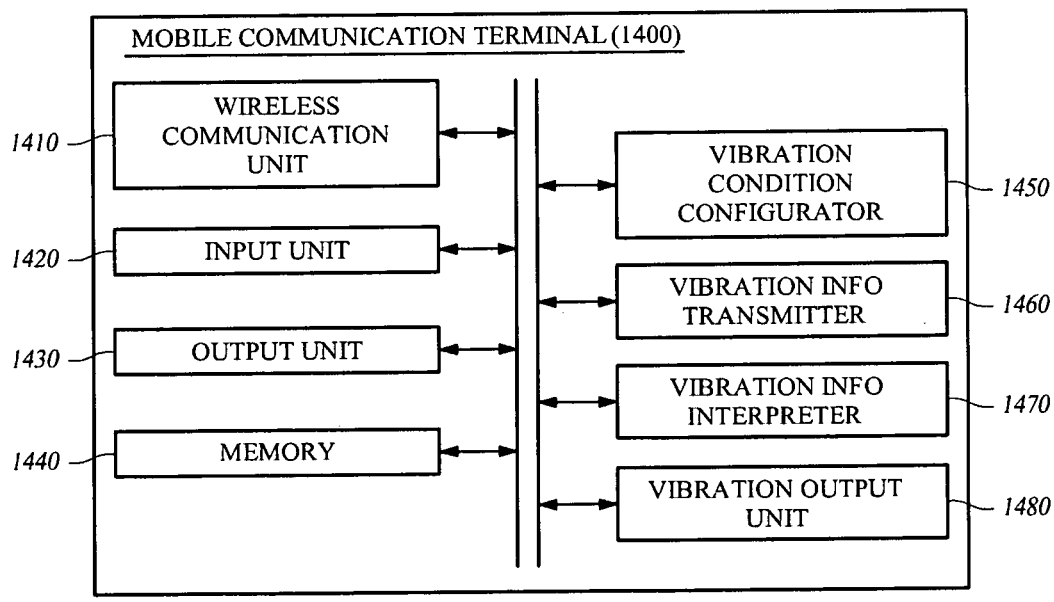
FIG. 13 illustrates still another example of a method of generating vibration according to the third embodiment of the present disclosure in more detail.
FIG. 14 illustrates another example of a construction of a mobile communication terminal according to the third embodiment of the present disclosure.

For example, the vibration condition searcher 960 extracts a vibration code (e.g. 0x01, 0x02, and 0x03) matching with a facial expression (e.g. smiling face, frowning face, or angry face as shown in FIG. 13) of the user or detailed information including a vibration type (e.g. short weak vibration, long weak vibration, or short strong vibration).

Meanwhile, when a signal corresponding to the vibration occurrence situation information is a signal transmitted from the call partner terminal, the vibration condition searcher 960 transfers the searched vibration information to the vibration output unit 980, so that the mobile communication terminal 900 can output the vibration.

For example, when a vocabulary received from the call partner terminal during a video communication and analyzed by the vocabulary recognizer 953 matches with a vibration condition including a preset vocabulary pattern for generating vibration, the vibration condition searcher 960 transfers vibration information of the vocabulary to the vibration output unit 980 so that the vibration output unit 980 can generate vibration relating to the vocabulary pattern. Thereafter, the vibration output unit 980 generates vibration relating to the vocabulary pattern by using the information received from the vibration condition searcher 960.

The vibration information transmitter 970 transmits the vibration information received from the vibration condition searcher 960 to the call partner terminal in video communication.

When the signal is a signal transmitted from the call partner terminal during the video communication, the vibration output unit 980 generates vibration corresponding to the vibration occurrence situation information searched by the vibration condition searcher 960.

FIG. 14 illustrates another example of a construction of a mobile communication terminal according to the third embodiment of the present disclosure. The following description with reference to FIG. 14 includes a case of transmitting vibration information according to user's setting and a case of generating vibration corresponding to vibration information transmitted from a call partner terminal.

As shown, the mobile communication terminal 1400 includes a wireless communication unit 1410, an input unit 1420, an output unit 1430, a memory 1440, a vibration condition configurator 1450, a vibration information transmitter 1460, a vibration information interpreter 1470, and a vibration output unit 1480.

The wireless communication unit 1410 for communication through a communication network, the input unit 1420 for input control, the output unit 1430 for visually or auditorily providing data required for a voice communication service or a data service, and the memory 1440 for storing information relating to the mobile communication terminal are elements included in a typical mobile communication terminal also, so a more detailed description thereof will be omitted here.

Upon receiving a vibration request according to a user's selection during a video communication, the vibration condition configurator 1450 outputs a pre-configured vibration condition setting menu and generates vibration information based on an input vibration condition.

The vibration condition setting menu is a menu by which the user can configure the intensity, period, etc. of the vibration.

The vibration information transmitter 1460 transmits vibration information configured by the vibration condition configurator 1450 to the call partner terminal.

Upon receiving vibration information from a call partner terminal during a video communication, the vibration information interpreter 1470 analyzes the vibration information and identifies vibration to output based on the analyzed vibration information.

When the vibration information transmitted from the call partner terminal has a form of a particular code, the vibration information interpreter 1470 extracts vibration information corresponding to the particular code from already stored vibration information. In contrast, when the vibration information transmitted from the call partner terminal has a form of detailed information including a vibration type, the vibration information interpreter 1470 transfers the vibration information to the vibration output unit 1480.

The vibration output unit 1480 generates vibration determined by the vibration information interpreter 1470.

For discrimination between a caller side mobile communication terminal and a receiving side mobile communication terminal in communication with each other, the mobile communication terminals are divided respectively into a first mobile communication terminal and a second mobile communication terminal in the following description.

Figure 15:
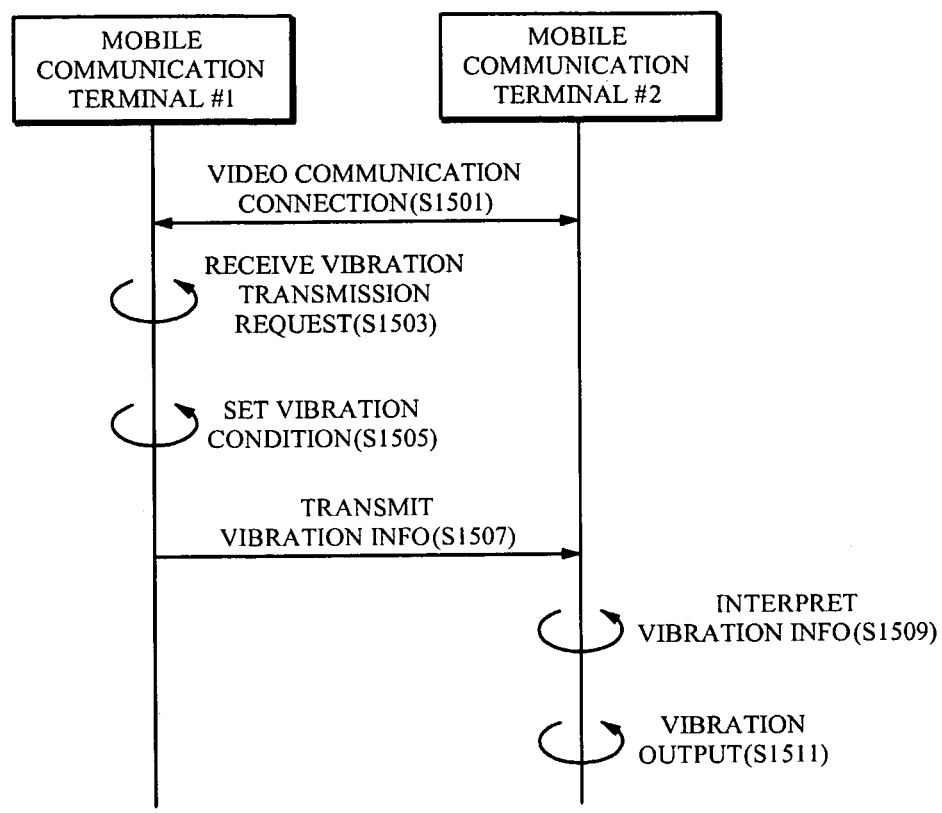
FIGS. 15 to 17 are signal flow diagrams illustrating a method of transferring vibration during a video communication according to the third embodiment of the present disclosure.

FIG. 15 is a signal flow diagram illustrating a method of transferring vibration during a video communication according to the third embodiment of the present disclosure, which will be described hereinafter based on the operation of the mobile communication terminal of FIG. 14 as an example.

First, during a video communication between a first mobile communication terminal and a second mobile communication terminal, when the first mobile communication terminal receives a vibration request according to a selection by a user, the first mobile communication terminal outputs a pre-configured vibration condition setting menu (steps S1501 and S1503).

The vibration condition setting menu is a menu by which the user can configure the intensity, period, etc. of the vibration, and may include additional items according to the user's necessity.

Thereafter, the first mobile communication terminal generates vibration information based on a vibration condition input by the user, and transmits the generated vibration information to the second mobile communication terminal in video communication with the first mobile communication terminal (steps S1505 and S1507).

Here, the vibration information is transmitted in the form of H.245, by using UUS (User to User Signaling), by generating standards in USSD (Unstructured Supplementary Service Data), or in the form of a message discriminated from a typical SMS (Short Message Service) based on a particular port.

Upon receiving the vibration information from the first mobile communication terminal during a video communication, the second mobile communication terminal analyzes the vibration information and determines vibration to output based on the analyzed vibration information (step S1509).

Thereafter, the second mobile communication terminal generates the vibration determined in step S1509 (step S1511).

When the vibration information transmitted from the first mobile communication terminal has a form of a particular code, the second mobile communication terminal extracts vibration information corresponding to the particular code from the already stored vibration information and generates vibration corresponding to the extracted vibration information.

In contrast, when the vibration information transmitted from the first mobile communication terminal has a form of detailed information including a vibration type, the second mobile communication terminal generates vibration according to the vibration type.

Figure 16:
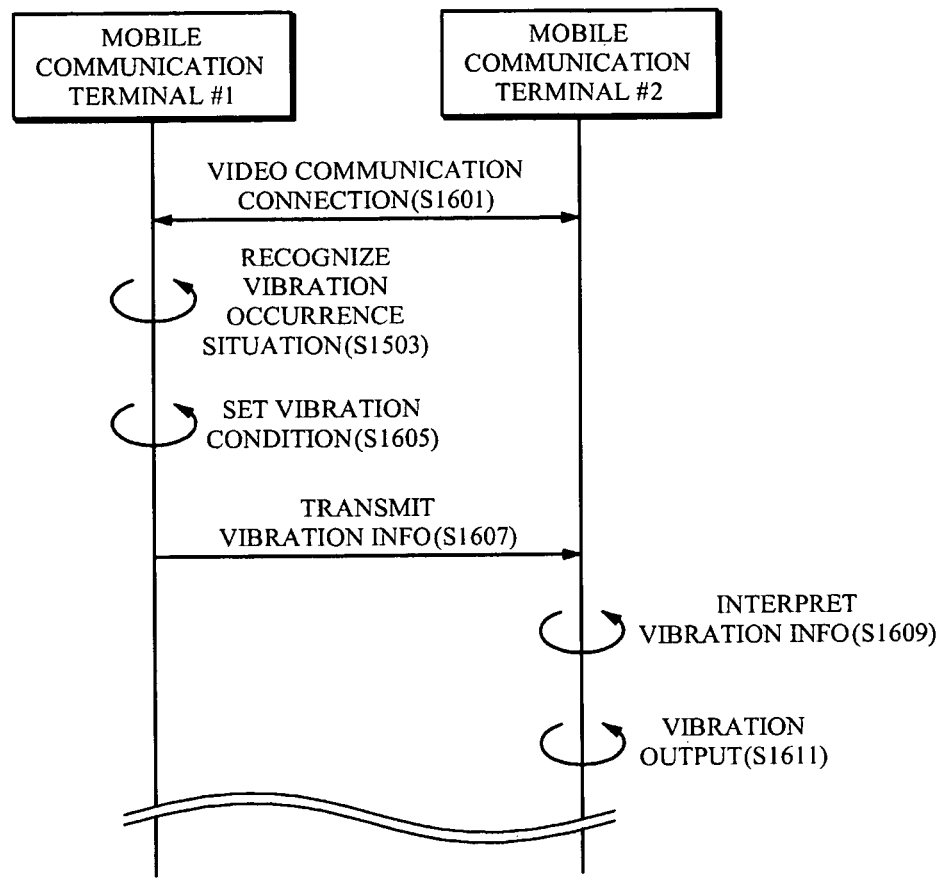

FIG. 16 is a signal flow diagram illustrating another method of transferring vibration during a video communication according to the third embodiment of the present disclosure.

First, during a video communication between a first mobile communication terminal and a second mobile communication terminal, the first mobile communication terminal recognizes the occurrence of a signal corresponding to vibration occurrence situation information (steps S1601 and S1603).

For example, when the vibration occurrence situation information corresponds to a signal indicating the movement of a mobile communication terminal, step S1603 corresponds to a step in which the first mobile communication terminal recognizes its own movement, acceleration, and rotation.

The first mobile communication terminal recognizes a linear movement, a rotation, and an acceleration of the mobile communication terminal.

The first mobile communication terminal detects the acceleration along one axis when the acceleration is measured in only one direction. However, when the acceleration is measured in three directions along the x axis, y axis, and z axis in three dimensional space, the first mobile communication terminal individually detects accelerations along the three axes including the x axis, y axis, and z axis. Further, when an accelerometer/gyro recognizer of the first mobile communication terminal is disposed based on the three axes, which implies that it can measure three axis angular velocities, the first mobile communication terminal detects the angular velocities in three dimensional space. Further, in order to recognize the magnitudes of the accelerations and the angular velocities, an accelerometer/gyro recognizer having a high resolution is implemented and used to measure the accelerations and the angular velocities.

Also, when the vibration occurrence situation information corresponds to a voice signal input by the user, step S1603 corresponds to a step in which the first mobile communication terminal analyzes the input voice signal and determines a corresponding vocabulary.

The voice signal is not a voice signal transmitted through the communication network, but is a voice signal input through a voice input unit (e.g. microphone; not shown) provided at the mobile communication terminal.

Moreover, when the vibration occurrence situation information corresponds to a facial expression signal, step S1603 corresponds to a step in which the first mobile communication terminal recognizes a facial expression of the user through its own camera during a video communication between the first mobile communication terminal and the second mobile communication terminal and determines if the recognized facial expression coincides with a facial expression pre-configured in order to generate vibration.

That is to say, the first mobile communication terminal determines if the facial expression of the user changes to satisfy a condition generating a vibration.

Thereafter, the first mobile communication terminal searches for and extracts vibration information matching with the vibration occurrence situation information (step S1605).

For example, when the vibration occurrence situation information corresponds to a signal indicating movement of a mobile communication terminal, step S1605 corresponds to a step in which the first mobile communication terminal determines if there is vibration information corresponding to the acceleration or the rotation and extracts the vibration information when the vibration information is found as a result of the determination.

Further, when the vibration occurrence situation information corresponds to a voice signal input by the user, step S1605 corresponds to a step in which the first mobile communication terminal compares the vocabulary determined in step S1603 with vocabulary patterns pre-configured in order to generate vibration, so as to determine if there is a coinciding vocabulary pattern corresponding to the determined vocabulary, and extracts vibration information corresponding to the coinciding vocabulary pattern when the coinciding vocabulary pattern is found through the determination.

In addition, when the vibration occurrence situation information corresponds to a facial expression signal, step S1605 corresponds to a step in which the first mobile communication terminal extracts vibration information corresponding to a pre-configured facial expression when the first mobile communication terminal has been determined that the facial expression of the user coincides with the pre-configured facial expression.

The first mobile communication terminal transmits the extracted vibration information to the second mobile communication terminal in video communication with the first mobile communication terminal (step S1607).

Upon receiving the vibration information from the first mobile communication terminal during the video communication, the second mobile communication terminal analyzes the vibration information and determines vibration to output based on the analyzed vibration information (step S1609).

Thereafter, the second mobile communication terminal generates the vibration determined in step S1609 (step S1611).

When the vibration information transmitted from the first mobile communication terminal has a form of a particular code, the second mobile communication terminal extracts vibration information corresponding to the particular code from the already stored vibration information and generates vibration corresponding to the extracted vibration information.

In contrast, when the vibration information transmitted from the first mobile communication terminal has a form of detailed information including a vibration type, the second mobile communication terminal generates vibration according to the vibration type.

Figure 17:
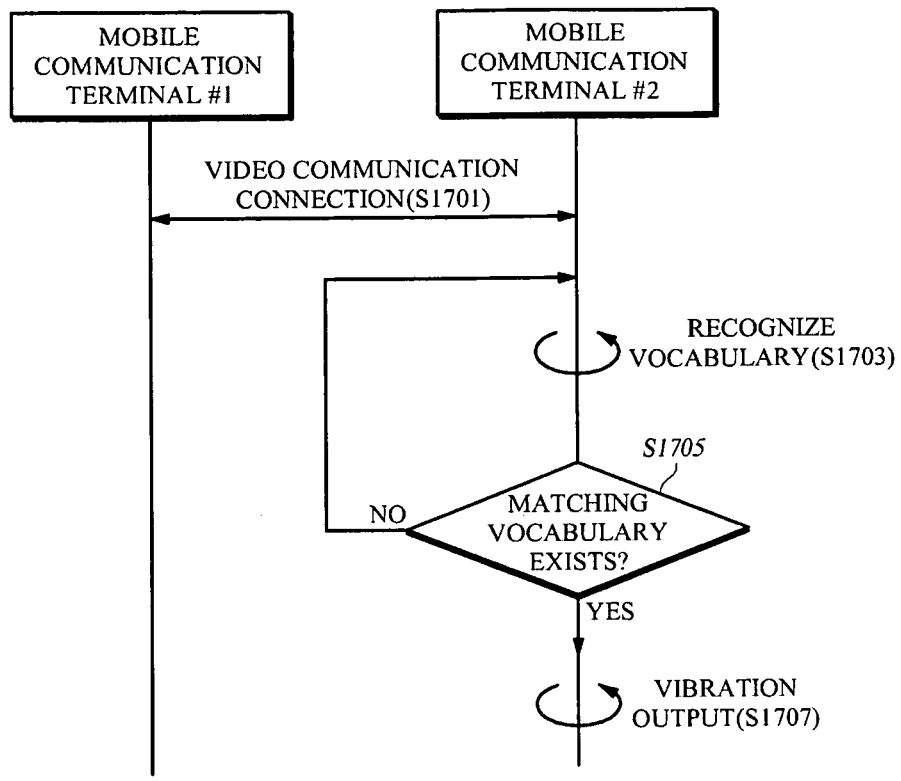

FIG. 17 is a signal flow diagram illustrating another method of transferring vibration during a video communication according to the third embodiment of the present disclosure, which will be described hereinafter based on the case of outputting vibration in response to a voice signal transmitted from a call partner mobile communication terminal as an example.

First, during a video communication between a first mobile communication terminal and a second mobile communication terminal, the second mobile communication terminal analyzes a voice signal transmitted from the first mobile communication terminal so as to determine a corresponding vocabulary (step S1701 and S1702).

Then, the second mobile communication terminal compares the vocabulary determined in step S1703 with vocabulary patterns pre-configured in order to generate vibration, so as to determine if there is a coinciding vocabulary pattern corresponding to the determined vocabulary (step S1705).

As a result of the determination, when there is a coinciding vocabulary pattern corresponding to the determined vocabulary, the second mobile communication terminal generates vibration corresponding to the coinciding vocabulary pattern (step S1707).

Here, the second mobile communication terminal pre-configures and stores information including vibration types matching with the vocabulary patterns and refers to the pre-configured and stored information at the time of generating the vibration.

Meanwhile, as a result of the determination, when a coinciding vocabulary pattern corresponding to the determined vocabulary is not found, the second mobile communication terminal performs the step after step S1701.

The vibration information disclosed by the present disclosure may further include sound, animation, etc. as well as the simple vibration, if necessary. To this end, the data format of the vibration information transmitted to the call partner terminal may have codes indicating vibration, sound, or animation, together with a code indicating a vibration transfer service.

The words a), b), and c) in the claims below do not imply a particular sequence and their sequence may be changed if necessary.

Although terminals are mobile communication terminals in the embodiments of the present disclosure described above, it goes without saying that the terminals may include wired terminals.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Also, every one of the components may be implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. As the computer readable media, the candidates include magnetic recording media, optical recording media, and carrier wave media.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

In an embodiment of the present disclosure as described above, which is applicable to the field of mobile communication terminals, when a user rocks a mobile communication terminal according to the user's feeling or emotion during a voice communication between the user and a call partner, the mobile communication terminal detects the rocking and transmits vibration information corresponding to the rocking of the mobile communication terminal to the call partner terminal, so as to generate vibration corresponding to the rocking of the mobile communication terminal in the call partner terminal. Therefore, by the embodiment of the present disclosure, the user of the mobile communication terminal and the call partner in voice communication can share their emotion and feelings through vibration.

Further, in another embodiment of the present disclosure as described above, which is also applicable to the field of mobile communication terminals, when the voice of a call partner in voice communication with a mobile communication terminal includes a predetermined word or phrase expressing an emotion of the call partner, the mobile communication terminal detects the predetermined word or phrase and generates vibration in a different (specific) vibration pattern depending on the predetermined word or phrase, so as to enable the user of the mobile communication terminal to feel the emotion of the call partner in voice communication through the vibration.

Further, in still another embodiment of the present disclosure as described above, a mobile communication terminal can transfer vibration expressing an emotion of a user of the mobile communication terminal to a call partner terminal during a video communication.

CROSS-REFERENCE TO RELATED APPLICATION

If applicable, this application claims priorities under 35 U.S.C. §119(a) on Patent Application No. 10-2008-0087644 filed in Korea on Sep. 5, 2008, Patent Application No. 10-2008-0088108 filed in Korea on Sep. 8, 2008, Patent Application No. 10-2009-0020054 filed in Korea on Mar. 10, 2009, the entire contents of which are hereby incorporated by reference. In addition, this non-provisional application claims priority in countries, other than the U.S., with the same reason based on the Korean Patent Applications, the entire contents of which are hereby incorporated by reference.

The invention claimed is:

1. A mobile communication terminal transferring vibration information, comprising:
   a display unit;
   a memory;
   an audio converter;
   an input unit configured to receive from a user a shift request for shifting of the mobile communication terminal into a vibration transfer mode, the input unit generating and transferring a vibration transfer mode shift command signal upon receiving the shift request in a state of call connection between the mobile communication terminal and a call partner terminal;
   a motion sensor unit to detect a movement of the mobile communication terminal and generate and transfer a first movement detection signal, which is an analog signal corresponding to the movement of the mobile communication terminal;
   an A/D converter to convert a first movement detection signal, which is an analog signal, to first vibration information, which is a digital signal, or to convert second vibration information, which is a digital signal generated and transmitted by the call partner terminal, to a second movement detection signal, which is an analog signal corresponding to a movement of the call partner terminal;
a vibration generator to receive the first movement detection signal or the second movement detection signal and generate vibration corresponding to the movement of the mobile communication terminal or the call partner terminal;
a wireless circuit unit to transmit the first vibration information to the call partner terminal and to receive the second vibration information from the call partner terminal; and
a controller to, upon receiving a vibration transfer mode shift command signal from the input unit, activate the motion sensor unit, receive the first movement detection signal from the motion sensor unit, transfer the first movement detection signal to the A/D converter and the vibration generator, and perform a control for transferring the first vibration information to the call partner terminal through the wireless circuit unit, and to, upon receiving the second vibration information through the wireless circuit unit during communication with the call partner terminal, transfer the second vibration information to the A/D converter and transfer the second movement detection signal converted by the A/D converter to the vibration generator.

2. The mobile communication terminal of claim 1, wherein the controller generates a first vibration information flag, which is information for enabling the call partner terminal to recognize that data transmitted through the mobile communication network during communication is the first vibration information, and transmits the first vibration information flag together with the first vibration information.

3. The mobile communication terminal of claim 1, wherein, by identifying the second vibration information flag received together with the second vibration information, the controller identifies that the data received from the call partner terminal is the second vibration information.

4. The mobile communication terminal of claim 1, wherein the motion sensor unit comprises one or more sensors among an acceleration sensor, an angular velocity sensor, a geomagnetic sensor, and a gyro sensor.

5. The mobile communication terminal of claim 1, wherein the controller transmits the first vibration information in one message format among a User to User Signaling (UUS) message format and an Unstructured Supplementary Service Data (USSD) message format.

6. A method for transferring vibration information at a mobile communication terminal comprising a display unit, a memory, input unit and an audio converter, the method comprising:
shifting to a vibration transfer mode, upon receiving a vibration transfer mode shift command signal via the input unit, in a state of call connection between the mobile communication terminal and a call partner terminal;
detecting a movement of the mobile communication terminal, and generating and transferring a first movement detection signal, which is an analog signal corresponding to the movement of the mobile communication terminal;
converting a first movement detection signal, which is an analog signal, to first vibration information, which is a digital signal, and transmitting the first vibration information to the call partner terminal, or receiving second vibration information, which is a digital signal generated and transmitted by the call partner terminal, and converting the second vibration information to a second movement detection signal, which is an analog signal corresponding to a movement of the call partner terminal; and
receiving the first movement detection signal or the second movement detection signal and generating vibration corresponding to the movement of the mobile communication terminal or the call partner terminal.

7. The method of claim 6, wherein the mobile communication terminal generates a vibration information flag and transmits the vibration information flag together with the first vibration information.

8. The method of claim 6, wherein the first vibration information is transmitted in one message format among a User to User Signaling (UUS) message format and an Unstructured Supplementary Service Data (USSD) message format.

9. A mobile communication terminal transferring emotion of a call partner, comprising:
a display unit;
a wireless circuit unit;
a speaker and a microphone;
a memory to store a voice information table, which contains one or more pieces of information among voice information and vibration pattern information corresponding to the voice information, the voice information including either analog voice signal information or digital voice signal information, each of which corresponds to voice;
an audio converter to convert a user analog voice signal, which corresponds to voice of a user of the terminal input through the microphone, into a user digital voice signal, and to receive a call partner digital voice signal, which corresponds to voice of the call partner in communication with the mobile communication terminal, through the wireless circuit unit and convert the received call partner digital voice signal to a call partner analog voice signal;
a input unit configured to receive from a user a voice recognition activation command for activating a voice recognition function of the mobile communication terminal and a voice information update command for updating the voice information table;
a voice recognizer to, upon recognizing particular voice information included in the voice information table from one signal among the call partner digital voice signal and the call partner analog voice signal, extract particular vibration pattern information corresponding to the particular voice information from the voice information table and transfer the extracted vibration pattern information;
a controller to activate the voice recognizer in response to receipt of the voice recognition activation command from the input unit, generate a vibration control signal corresponding to the particular vibration pattern information, and to update the voice information table in response to receipt of the voice information update command from the input unit; and
a vibration generator to generate vibration corresponding to the generated vibration control signal.

10. The mobile communication terminal of claim 9, wherein, upon receiving the voice information update command, the controller extracts one signal among the user analog voice signal and the user digital voice signal from the audio converter, generates user voice information from the extracted signal, matches the user voice information to user selection vibration pattern information, which is vibration pattern information selected by the user of the terminal, and updates the voice information table based on matching between the user voice information and the user selection vibration pattern information.

11. The mobile communication terminal of claim 9, wherein, upon receiving the voice information update command while the mobile communication terminal is in communication with the call partner terminal, the controller extracts one signal among the call partner digital voice signal and the call partner analog voice signal from the audio converter, generates call partner voice information from the extracted signal, matches the call partner voice information to user selection vibration pattern information, which is user selection vibration pattern information, and updates the voice information table based on matching between the call partner voice information and the user selection vibration pattern information.

12. The mobile communication terminal of claim 9, wherein, when the voice information includes the digital voice signal information, the voice recognizer recognizes particular digital voice signal information included in the voice information table from the call partner digital voice signal, extracts the particular vibration pattern information corresponding to the particular digital voice signal information from the voice information table, and transfers the extracted particular vibration pattern information to the controller.

13. The mobile communication terminal of claim 9, wherein, when the voice information includes the analog voice signal information, the voice recognizer recognizes particular analog voice signal information included in the voice information table from the call partner analog voice signal, extracts the particular vibration pattern information corresponding to the particular analog voice signal information from the voice information table, and transfers the extracted particular vibration pattern information to the controller.

14. A method for transferring emotion of a call partner in communication by a mobile communication terminal comprising an input unit, a voice recognizer, a controller, a vibration generator, and a memory, the method comprising:
comparing, by the voice recognizer, one signal among a call partner digital voice signal and a call partner analog voice signal, which corresponds to voice of the call partner, with a voice information table stored in the memory;
when it is recognized that one signal among the call partner analog voice signal and the call partner digital voice signal matches with particular voice information included in the voice information table, extracting particular vibration pattern information corresponding to the recognized particular voice information from the voice information table and transferring the extracted particular vibration pattern information to the controller;
generating a vibration control signal corresponding to the particular vibration pattern information and transferring the generated vibration control signal to the vibration generator by the controller; and
generating vibration corresponding to the vibration control signal by the vibration generator.

15. The method of claim 14, wherein, in comparing of said one signal with the voice information table, the voice information table contains one or more pieces of information among voice information and vibration pattern information corresponding to the voice information, the voice information including either analog voice signal information or digital voice signal information, each of which corresponds to voice.

16. The method of claim 15, wherein, when the voice information includes the digital voice signal information, the voice recognizer compares the call partner digital voice signal with one or more pieces of digital voice signal information included in the voice information table.

17. The method of claim 15, wherein, when the voice information includes the analog voice signal information, the voice recognizer compares the call partner analog voice signal with one or more pieces of analog voice signal information included in the voice information table.

18. A mobile communication terminal comprising:
a vibration occurrence situation recognizer to recognize a vibration occurrence situation by comparing a signal transmitted from a call partner terminal or a signal input to the mobile communication terminal by a user during a video communication with a pre-configured vibration occurrence situation;
a vibration condition searcher to search for vibration information, which matches with the vibration occurrence situation information recognized by the vibration occurrence situation recognizer, and to transfer the vibration information matching with the vibration occurrence situation information to the vibration information transmitter; and
a vibration information transmitter to transmit the vibration information received from the vibration condition searcher to the call partner terminal in video communication.

19. The mobile communication terminal of claim 18, further comprising a vibration output unit to generate vibration corresponding to the vibration occurrence situation information searched by the vibration condition searcher when the signal is a signal transmitted from the call partner terminal during video communication.

20. The mobile communication terminal of claim 19, wherein the vibration occurrence situation recognizer comprises:
an accelerometer/gyro recognizer to recognize movement of a mobile communication terminal during video communication and detect an acceleration and a rotation of the mobile communication terminal;
a vocabulary recognizer to analyze a voice signal input by the user and a voice signal transmitted from the call partner terminal during the video communication, so as to identify a corresponding vocabulary; and
a face recognizer to recognize a facial expression of the user through a camera provided at the mobile communication terminal during the video communication.

21. The mobile communication terminal of claim 20, wherein the vibration condition searcher searches for vibration information, which matches with acceleration information or rotation information recognized by the accelerometer/gyro recognizer, and transfers matching vibration information to the vibration information transmitter when the vibration condition searcher has found matching vibration information matching with the acceleration information or the rotation information.

22. The mobile communication terminal of claim 21, wherein the accelerometer/gyro recognizer recognizes a linear movement, a rotation, and an acceleration of the mobile communication terminal.

23. The mobile communication terminal of claim 20, wherein the accelerometer/gyro recognizer recognizes a linear movement, a rotation, and an acceleration of the mobile communication terminal.

24. The mobile communication terminal of claim 20, wherein the vibration condition searcher compares a vocabulary, which has been input by the user during a video communication and detected by the vocabulary recognizer, with vocabulary patterns set in advance to generate vibration, and, when there is a vocabulary pattern matching with the compared vocabulary, the vibration condition searcher transfers vibration information on the vocabulary pattern to the vibration information transmitter, so that the vibration information transmitter can transmit the vibration information to the call partner terminal.

25. The mobile communication terminal of claim 20, wherein, when a vocabulary received from a call partner terminal during a video communication and analyzed by the vocabulary recognizer matches with a vibration condition including a preset vocabulary pattern for generating vibration, the vibration condition searcher transfers vibration information of the vocabulary to the vibration output unit so that the vibration output unit can generate vibration relating to the vocabulary pattern.

26. The mobile communication terminal of claim 20, wherein the vibration condition searcher determines if a facial expression of the user detected by the face recognizer coincides with facial expression patterns set in advance to generate vibration, and, when the facial expression of the user coincides with a preset facial expression pattern, the vibration condition searcher transfers vibration information of the preset facial expression to the vibration information transmitter.

27. A method for transferring vibration to a second mobile communication terminal at a first mobile communication terminal during video communication between the first mobile communication and the second mobile communication, the method comprising:
    recognizing a vibration occurrence situation at the first mobile communication terminal, by comparing a signal received from the second mobile communication terminal or a signal input to the first mobile communication terminal by a user with a pre-configured vibration occurrence situation;
    searching for and extracting vibration information matching with the recognized vibration occurrence situation by the first mobile communication terminal; and
    transmitting the extracted vibration information to the second mobile communication terminal by the first mobile communication terminal.

28. The method of claim 27, wherein, in recognizing of the occurrence of the signal, when the vibration occurrence situation information corresponds to a signal indicating movement of a mobile communication terminal, the first mobile communication terminal recognizes its own movement, acceleration, and rotation.

29. The method of claim 28, wherein, in searching for and extracting of the vibration information, the first mobile communication terminal determines if there is vibration information corresponding to the acceleration or the rotation and extracts the corresponding vibration information when the corresponding vibration information is found as a result of the determination.

30. The method of claim 29, wherein the vibration information is transmitted in a form of H.245, by using User to User Signaling (UUS), by generating standards in Unstructured Supplementary Service Data (USSD), or in a form of a message discriminated from a typical Short Message Service (SMS) based on a particular port.

31. The method of claim 28, further comprising:
    after transmitting the vibration information to the second mobile communication terminal by the first mobile communication terminal,
    when the vibration information transmitted from the first mobile communication terminal has a form of a particular code, extracting vibration information corresponding to the particular code from the already stored vibration information and generating vibration corresponding to the extracted vibration information by the second mobile communication terminal; and
    when the vibration information transmitted from the first mobile communication terminal has a form of detailed information including a vibration type, generating vibration according to the vibration type by the second mobile communication terminal.

32. The method of claim 28, wherein the vibration information is transmitted in a form of H.245, by using User to User Signaling (UUS), by generating standards in Unstructured Supplementary Service Data (USSD), or in a form of a message discriminated from a typical Short Message Service (SMS) based on a particular port.

33. The method of claim 27, wherein, in recognizing of the occurrence of the signal, when the vibration occurrence situation information corresponds to a voice signal input by the user, the first mobile communication terminal analyzes the input voice signal and determines a corresponding vocabulary.

34. The method of claim 33, wherein, in searching for and extracting of the vibration information, the first mobile communication terminal compares the vocabulary determined in recognizing of the occurrence of the signal with vocabulary patterns pre-configured in order to generate vibration, so as to determine if there is a coinciding vocabulary pattern corresponding to the determined vocabulary, and extracts vibration information corresponding to the coinciding vocabulary pattern when the coinciding vocabulary pattern is found through the determination.

35. The method of claim 34, wherein the vibration information is transmitted in a form of H.245, by using User to User Signaling (UUS), by generating standards in Unstructured Supplementary Service Data (USSD), or in a form of a message discriminated from a typical Short Message Service (SMS) based on a particular port.

36. The method of claim 33, wherein the vibration information is transmitted in a form of H.245, by using User to User Signaling (UUS), by generating standards in Unstructured Supplementary Service Data (USSD), or in a form of a message discriminated from a typical Short Message Service (SMS) based on a particular port.

37. The method of claim 27, wherein, in recognizing of the occurrence of the signal, when the vibration occurrence situation information corresponds to a facial expression signal, the first mobile communication terminal recognizes a facial expression of the user through a camera of the first mobile communication terminal during a video communication between the first mobile communication terminal and the second mobile communication terminal and determines if the recognized facial expression coincides with a facial expression pre-configured in order to generate vibration.

38. The method of claim 37, wherein, in searching for and extracting of the vibration information, the first mobile communication terminal extracts vibration information corresponding to a pre-configured facial expression when the first mobile communication terminal has been determined that the facial expression of the user coincides with the pre-configured facial expression.

39. The method of claim 38, wherein the vibration information is transmitted in a form of H.245, by using User to User Signaling (UUS), by generating standards in Unstructured Supplementary Service Data (USSD), or in a form of a message discriminated from a typical Short Message Service (SMS) based on a particular port.

40. The method of claim 37, wherein the vibration information is transmitted in a form of H.245, by using User to User Signaling (UUS), by generating standards in Unstructured Supplementary Service Data (USSD), or in a form of a message discriminated from a typical Short Message Service (SMS) based on a particular port.

41. The method of claim 27, further comprising:
   after transmitting the vibration information to the second mobile communication terminal by the first mobile communication terminal,
   when the vibration information transmitted from the first mobile communication terminal has a form of a particular code, extracting vibration information corresponding to the particular code from the already stored vibration information and generating vibration corresponding to the extracted vibration information by the second mobile communication terminal; and
   when the vibration information transmitted from the first mobile communication terminal has a form of detailed information including a vibration type, generating vibration according to the vibration type by the second mobile communication terminal.

42. The method of claim 27, wherein the vibration information is transmitted in a form of H.245, by using User to User Signaling (UUS), by generating standards in Unstructured Supplementary Service Data (USSD), or in a form of a message discriminated from a typical Short Message Service (SMS) based on a particular port.

43. The method of claim 27, wherein the vibration information is transmitted in a form of H.245, by using User to User Signaling (UUS), by generating standards in Unstructured Supplementary Service Data (USSD), or in a form of a message discriminated from a typical Short Message Service (SMS) based on a particular port 1.

44. A method for transferring vibration during video communication, the method comprising:
   during a video communication between a first mobile communication terminal and a second mobile communication terminal, analyzing a voice signal transmitted from the first mobile communication terminal and thereby determining a corresponding vocabulary by the second mobile communication terminal;
   comparing the determined vocabulary with vocabulary patterns pre-configured in order to generate vibration, so as to determine if there is a coinciding vocabulary pattern corresponding to the determined vocabulary by the second mobile communication terminal; and
   when there is a coinciding vocabulary pattern corresponding to the determined vocabulary, generating vibration corresponding to the coinciding vocabulary pattern by the second mobile communication terminal.

* * * * *